(12) United States Patent
Ito et al.

(10) Patent No.: US 8,290,348 B2
(45) Date of Patent: *Oct. 16, 2012

(54) AV DATA RECORDING APPARATUS AND METHOD, DISK RECORDED WITH THE AV DATA RECORDING APPARATUS OR METHOD, AND AV DATA REPRODUCING APPARATUS AND METHOD

(75) Inventors: Masanori Ito, Moriguchi (JP);
Masafumi Shimotashiro, Katano (JP);
Makoto Mitsuda, Ibaraki (JP); Tadashi Nakamura, Katano (JP); Yasumori Hino, Ikoma (JP)

(73) Assignee: Panasonic Corporation, Osaka (JP)

( * ) Notice: Subject to any disclaimer, the term of this patent is extended or adjusted under 35 U.S.C. 154(b) by 1407 days.

This patent is subject to a terminal disclaimer.

(21) Appl. No.: 11/904,356

(22) Filed: Sep. 27, 2007

(65) Prior Publication Data

US 2008/0025700 A1    Jan. 31, 2008

Related U.S. Application Data

(63) Continuation of application No. 09/786,611, filed as application No. PCT/JP00/04562 on Jul. 6, 2000, now Pat. No. 7,292,781.

(30) Foreign Application Priority Data

Jul. 7, 1999  (JP) .................................... 11-192910
Nov. 11, 1999  (JP) .................................... 11-321586

(51) Int. Cl.
*H04N 5/92*    (2006.01)

(52) U.S. Cl. ...................................................... 386/338

(58) Field of Classification Search ........................ None
See application file for complete search history.

(56) References Cited

U.S. PATENT DOCUMENTS 5,058,096 A    10/1991    Ando et al.
5,572,333 A    11/1996    Moriyama et al.
(Continued)

FOREIGN PATENT DOCUMENTS

EP    0 737 975    10/1996
(Continued)

OTHER PUBLICATIONS

Weiss, et al., "Switching Facilities in MPEG-2: Necessary but not Sufficient", SMPTE Journal, SMPTE Inc., Scarsdale, NY, vol. 104, No. 12, Dec. 1995, pp. 788-802.

*Primary Examiner* — Huy T Nguyen
(74) *Attorney, Agent, or Firm* — Hamre, Schumann, Mueller & Larson, P.C.

(57) ABSTRACT

The present invention provides an AV data recording apparatus and method that facilitate various processes concerning a recorded video, including continuous reproduction, digital transmission, file operation, partial deletion, and post-recording. The AV data recording apparatus divides an audio signal and a video signal into transport packets having a predetermined unit length, assembles a plurality of transport packets as one transport stream and executes recording. Accordingly, this invention enables managing whether a logical block is used or not, detecting a continuous data area comprising plural logical blocks that ensure realtime continuous reproduction, and determining logical block numbers of continuous data areas to be recorded. As a result, the transport stream is recorded continuously on a plurality of detected continuous data areas.

10 Claims, 37 Drawing Sheets

U.S. PATENT DOCUMENTS

| | | | |
|---|---|---|---|
| 5,822,493 A | 10/1998 | Uehara et al. | |
| 6,078,727 A | 6/2000 | Saeki et al. | |
| 6,097,557 A | 8/2000 | Inoue et al. | |
| 6,112,009 A | 8/2000 | Kikuchi et al. | |
| 6,118,924 A | 9/2000 | Nakatani et al. | |
| 6,219,311 B1 | 4/2001 | Mitsuno | |
| 6,285,825 B1 | 9/2001 | Miwa et al. | |
| 6,304,717 B1 | 10/2001 | Fujinami | |
| 6,571,309 B2 | 5/2003 | Ando et al. | |
| 6,574,420 B1 | 6/2003 | Gotoh et al. | |
| 7,292,781 B1 * | 11/2007 | Ito et al. | 386/329 |
| 2005/0111836 A1 | 5/2005 | Kato | |

FOREIGN PATENT DOCUMENTS

| | | |
|---|---|---|
| EP | 0 749 244 | 12/1996 |
| EP | 0 849 958 | 6/1998 |
| EP | 0 903 742 | 3/1999 |
| EP | 0 905 699 | 3/1999 |
| EP | 0 926 903 | 6/1999 |
| EP | 0 953 977 | 11/1999 |
| JP | 8-339630 | 12/1996 |
| JP | 10-334615 | 12/1998 |
| JP | 11-55315 | 2/1999 |
| JP | 11-73729 | 3/1999 |
| JP | 11-73737 | 3/1999 |
| JP | 11-144378 | 5/1999 |
| JP | 11-155130 | 6/1999 |
| JP | 11-195287 | 7/1999 |
| KR | 1989-7000901 | 4/1989 |
| KR | 1998-087467 | 12/1998 |
| WO | 99/13469 | 3/1999 |

* cited by examiner

File Entry

| | | |
|---|---|---|
| Allocation Descriptor Length | | 20 |
| ... | | |
| Allocation Descriptor | Extent Length | 32766144 |
| | Recorded Length | 32766144 |
| | Extent Location | 80000 |

FIG. 8

File Entry

| | | |
|---|---|---|
| Allocation Descriptor Length | | 60 |
| ... | | |
| Allocation Descriptor A | Extent Length | 16384000 |
| | Recorded Length | 16383072 |
| | Extent Location | 80000 |
| Allocation Descriptor B | Extent Length | 18432 |
| | Recorded Length | 16544 |
| | Extent Location | 88032 |
| Allocation Descriptor C | Extent Length | 16299600 |
| | Recorded Length | 16299600 |
| | Extent Location | 88048 |

FIG. 9

File Entry

| | | |
|---|---|---|
| Allocation Descriptor Length | | 8 |
| ... | | |
| Allocation Descriptor | Extent Length | 32766144 |
| | Extent Position | 80000 |

FIG. 18

File Entry

| | |
|---|---|
| Allocation Descriptor Length | 16 |
| ... | |
| Allocation Descriptor A — Extent Length | 16406760 |
| Allocation Descriptor A — Extent Position | 80000 |
| Allocation Descriptor B — Extent Length | 16261312 |
| Allocation Descriptor B — Extent Position | 88059 |

FIG. 19

File Entry

| | | |
|---|---|---|
| Allocation Descriptor Length | | 12 |
| ... | | |
| Allocation Descriptor | Extent Offset | 0 |
| | Recorded Length | 32766144 |
| | Extent Location | 80000 |

FIG. 24

File Entry

| | | |
|---|---|---|
| Allocation Descriptor Length | | 24 |
| ... | | |
| Allocation Descriptor A | Extent Offset | 0 |
| | Recorded Length | 16406760 |
| | Extent Location | 80000 |
| Allocation Descriptor B | Extent Offset | 1944 |
| | Recorded Length | 16259368 |
| | Extent Location | 88059 |

FIG. 25

| Logical Block | #5000 | .... | #5010 | #5011 | ..... | #5025 | #5026 | ..... | #5035 |
|---|---|---|---|---|---|---|---|---|---|
| VOBU | #0 | | Free | #1 | | Free | #2 | | Free |

FIG. 34

AV DATA RECORDING APPARATUS AND METHOD, DISK RECORDED WITH THE AV DATA RECORDING APPARATUS OR METHOD, AND AV DATA REPRODUCING APPARATUS AND METHOD

CROSS-REFERENCE TO RELATED APPLICATION

This application is a Continuation of application Ser. No. 09/786,611, filed Mar. 6, 2001, which is a U.S. National Stage application of PCT/JP00/04562, filed Jul. 6, 2000, which applications are incorporated herein by reference.

TECHNICAL FIELD

The present invention relates to an AV data recording/reproducing apparatus and a method, which MPEG-compress a video and an audio in real time and record the video and the audio on a recording medium such as an optical disk.

BACKGROUND ART

Methods for compressing a video at a low bit rate include a system stream defined in the MPEG2 standard (ISO/IEC 13818-1). Three types are defined for such system streams: a program stream, a transport stream and a PES stream.

For video recording media used in place of magnetic tapes, optical disks such as DVD-RAM and MO have been noticed. Among them, there is a "video recording standard" for recording a video on a DVD-RAM (DVD Specifications for Re-writable/Re-recordable Discs Part 3 VIDEO RECORDING version 1.0 September 1999). FIG. 27 is a diagram showing a structure of a conventional apparatus for realtime recording/reproducing video using a DVD-RAM disk. In FIG. 27, signals inputted from a video signal input section 1 and an audio signal input section 2 are compressed respectively at a video compressing section 3 and an audio compressing section 4 in order to create a program stream at a program stream assembling section 51, and the program stream is written on a DVD-RAM disk 81 via a recording section 6 and a pickup 7. During reproduction, the program stream that is taken out via the pickup 7 and a reproducing section 31 is divided into a video signal and an audio signal at a program stream disassembling section 37, and the signals are outputted respectively into a video display section 35 and an audio output section 36 via a video extending section 33 and an audio extending section 34.

When a video signal is outputted outwards via a 1394 interface, the program stream that has been taken out via the reproducing section 31 is converted into a transport stream at a section 11 for PS/TS conversion and for output timing generation, and subsequently sent to a 1394 interface section 9. When a video signal is inputted via the 1394 interface section 9 and recorded, a video signal in a transport stream form inputted from outside into the 1394 interface is converted to be a program stream form at a TS/PS converting section 12, and recorded on a DVD-RAM disk 81 via the recording section 6.

When a video signal is recorded, a recording control section 61 controls the recording section 6. A continuous data area detecting section 62 checks the status of use of sectors managed at a logical block managing section 63 and detects a free area that is physically continuous in compliance with an instruction from the recording control section 61.

For deleting a recorded video signal file, a deletion control section 64 controls the recording section 6 and the reproducing section 31 to execute deletion process.

If post-recording will be executed after the recording, a video is recorded while a section 10 generating a dummy packet for post-recording is being driven. Accordingly, dummy data will be mixed in a MPEG system stream.

During post-recording, a post-recording control section 65 drives the reproducing section 31 to show a user a previously-recorded video, while it records a secondary audio matching the video by controlling the recording section 6. Accordingly, a post-recording process is completed.

FIG. 28 shows a recording format for recording a video in real time on a DVD-RAM. A DVD-RAM is composed of 2 kbyte sectors. Sixteen sectors are treated as one logical block. Each logical block is provided with an error correction code and recorded on the DVD-RAM. Subsequently, logical blocks physically continuing for at least 11 seconds at a conversion with a maximum recording/reproducing rate are maintained as a continuous data area, on which unit video packets (Video OBject Unit: VOBU) consisting of a MPEG stream ranging from 0.4 to 1 second are recorded in order. One. VOBU is composed of packs as a lower hierarchy of the 2 kbyte unit MPEG program stream. The packs include two types: a video pack (V_PCK) in which video compression data are stored, and an audio pack (A_PCK) in which audio compression data are stored. One VOBU includes all V_PCKs and A_PCKs of the corresponding times.

The continuous data area detecting section 62 of the AV data recording/reproducing apparatus executes re-detection of a next continuous data area at the time that a remainder of a continuous data area becomes shorter than three seconds at a conversion with a maximum recording/reproducing rate. When a continuous data area is filled, the next continuous data area is subject to writing.

FIG. 29 is a diagram to show that a content recorded on a DVD-RAM is managed by a UDF (Universal Disk Format) file system or by an ISO/IEC 13346 (Volume and file structure of write once and rewritable media using non-sequential recording for information interchange) file system. In FIG. 29, a MPEG program stream that has been recorded continuously is recorded as a file VR_MOVIE.VRO. For this file, the file name and location for a file entry are managed by FID (File Identifier Descriptor).

Here, the UDF standard corresponds to a subset of the ISO/IEC 13346 standard. A DVD-RAM drive is connected to a personal computer (PC) through a 1394 interface and through SBP-2 (Serial Bus Protocol-2) protocol, so that a file written in a form based on UDF can be treated also as one file by a PC.

A file entry uses an allocation descriptor so as to manage continuous data areas 'a', 'b' and 'c' in which data are stored. Specifically, when a defect logical block is found while the recording control section 61 executes recording on a continuous data area 'a', the logical block is skipped and writing is continued from the head of the continuous data area 'b'. As it will bump into a record area of a PC file while the recording control section 61 is recording on the continuous data area 'b', writing is continued this time from the head of the continuous data area 'c'. As a result, the file VR_MOVIE.VRO is composed of the continuous data areas 'a', 'b' and 'c'.

FIG. 30 illustrates structures of allocation descriptors. FIG. 30A shows a format of a short allocation descriptor, and FIG. 30B shows a format of an extended allocation descriptor. The extent length denotes a data size indicated by byte, and the extent location denotes a starting sector number of data. The recorded length denotes an actually recorded data size indicated by byte. The information length denotes the data size before compression indicated by byte in a case that the data is compressed. The usable area indicated as Implementation Use is an area for free use. Based on the description rule for allocation descriptor, a starting location of data to which the allocation descriptors 'a', 'b' and 'c' in FIG. 29 refer matches the head of a sector, and the extent length of the allocation descriptors 'a' and 'b' other than the last 'c' is required to be an integral multiple of one sector. However, when a recorded length of an extended allocation descriptor is used, an effective data length is not necessarily an integral multiple of one sector, but an effective data length shorter than the extended length can be allocated. Though the extended allocation descriptor has a specification defined by ISO/IEC 13346 standard, it cannot be used in the UDF standard that is adopted for DVD-ROM/RAM. Classification of the allocation descriptor is described within a file entry.

A data size of a VOBU varies within a range not exceeding a maximum recording/reproducing rate as long as the video has a variable bit rate. When the video has a fixed bit rate, the data size of the VOBU will be constant substantially.

When reproducing a record content, the reading of data from a phase-change optical disk and reproduction of the read data are executed simultaneously. At this time, the rate for reading data is set to be faster than the maximum rate for reproducing data, so that control is executed to keep data for reproduction. Therefore, when continuous data reading and continuous data reproduction are performed, spare data for reproduction can be secured by the difference between the maximum data reproducing rate and the data reading rate. The spare data will be used as reproduction data while data reading is interrupted due to jumping of a pickup, so that continuous reproduction will be realized.

Specifically, spare data of 24 Mbit are required as spare reproduction data during a move of the pickup, when the data reading rate at the reproducing section 31 is 11 Mbps, the maximum data reproduction rate at the program stream assembling section 5 and at the program stream disassembling section 37 is 8 Mbps, and a maximum move time of the pickup is 3 seconds. For securing the spare data, continuous reading for 8 seconds is required. That is, reading should be continued for a period corresponding to the time obtained by dividing 24 Mbits by a difference between the data reading rate of 11 Mbps and the maximum data recording/reproducing rate of 8 Mbps.

Since data of at most 88 Mbits, i.e., reproduction data for 11 seconds are read during a continuous data reading of 8 seconds, continuous data reproduction can be ensured by securing a continuous data area of at least 11 seconds.

Several defect logical blocks can be included in the continuous data areas. In such a case, however, the continuous data areas should be increased slightly to exceed 11 seconds by expecting a reading time required for reading the defect logical blocks during reproduction.

A merit of optical disks, which magnetic tapes do not have, is a function that allows a user to delete desired parts to increase recordable capacity. If a specific VOBU#51 in the program stream shown in FIG. 31 is deleted and VOBU#52 with the following VOBUs are closed forward as shown in FIG. 32, free capacity can be increased by the size of the VOBU#51 without breaking the format of the program stream.

Typical consumer movies are provided with a function of "post-recording". This is a function to change an audio recorded with a video (primary audio) into a newly recorded audio (secondary audio). Accordingly, the secondary audio can be reproduced synchronizing with the video at the time of reproduction.

On the other hand, plural audios can be recorded in a mixed form within the MPEG system stream, and the respective audios are identified with their stream ID numbers. For example, the primary audio has a stream ID "0xE0" and the secondary audio has a stream ID "0xE1".

FIG. 33 shows a record content in an AV data recording/reproducing apparatus using a DVD-RAM, and the content is subject to post-recording. When a MPEG program stream that will be post-recorded is recorded in DVD-RAM as shown in FIG. 17, a section 10 generating dummy packet for post-recording shown in FIG. 12 executes recording by mixing V_PCKs, A_PCKs and also dummy packets (hereinafter, each dummy packet is referred to as "D_PCK"). During post-recording (in recording the secondary audio), only the video (or a video and the secondary audio) is reproduced, and at the same time, compressed secondary audio is padded in the D_PCK location as a separate secondary audio other than the primary audio.

During reproduction, a video stream and an audio stream of the secondary audio are reproduced to allow a post-recorded video to be watched.

Future AV apparatuses will have IEEE 1394 digital interfaces as standard equipment. However, for a video transmission protocol using isochronous transmission on such an IEEE 1394 interface, only an MPEG transport stream is defined.

Therefore, when a video is transmitted to a D-VHS or to a set top box (STB) via an IEEE 1394 digital interface in a conventional AV data recording apparatus, a MPEG program stream should be converted first into a PES stream and subsequently into a MPEG transport stream. This requires a complicated conversion system.

In a case of recording by using a MPEG transport stream, as shown in FIG. 34, writing is executed so that a head of a VOBU having a length of a multiple of 188 bytes matches a head of a logical block. While head address information of the VOBU can be expressed with less bit numbers, a waste area of up to (32K−1) bytes is generated in each VOBU. This waste area corresponds to 4% at most, and 2% in average of the entire record area when a VOBU is a MPEG transport stream of 1.5 Mbps per 0.5 seconds.

Moreover, in order to show a record content as a file on a PC, the entire record content should be linked, for example, by using an allocation pointer. In this method, however, the file cannot be observed as one file based on the MPEG standard concerning PC since a free area is included in the file.

Other problems are as follows. When every VOBU is treated as one file by referring with an independent extended allocation pointer, numbers of allocation pointers should be used for one file. Moreover, since a PC equipped with a reading driver software based on the UDF standard does not correspond to such allocation pointers, a VOBU cannot be treated as one file.

In general, when a user records a MPEG program stream on an optical disk and deletes VOBUs in the way, and subsequently he manages it as a file in a recording apparatus or he treats it as a file at the time of connecting to a PC, VOBUs following the deleted VOBU should be linked forward and duplicate the following VOBUs forward. In such a process, however, process amounts will be increased as the following VOBU area is longer.

When a dummy pack is exchanged with a secondary audio at the time of post-recording for a MPEG program stream recorded on an optical disk, another process called Read Modified Write or "RMW" will arise. In RMW, after reading of an entire logical block including a dummy pack (logical block #i in FIG. 33) starts, only the dummy pack part is exchanged with a packet of a secondary audio packet and rewritten in the same logical block. Since this process causes a heavy process load, actual post-recording will be difficult to execute.

DISCLOSURE OF THE INVENTION

To solve the above-mentioned problems, the present invention provides a video recording apparatus that can record and continuously reproduce a video easily with D-VHS and a set top box (STB) via an IEEE 1394 digital interface.

Further, the present invention aims to perform recording that wastes memory less, and in which a MPEG transport stream that is recorded at the time of connecting to a PC can be observed easily as data based on the MPEG standard.

As mentioned above, the present invention aims to provide a recording method to ensure in an easy and efficient manner both realtime recording/realtime reproduction by using a means for isochronous transmission of a video and an audio via a digital interface, and also reproduction of a file (a file can be reproduced when it is based on the MPEG standard) using a means for asynchronous transmission at the time of connecting to a PC.

The present invention also aims to decrease the process amounts in any cases, e.g., deleting a VOBU in a way of a MPEG stream and subsequently linking the following VOBUs to provide a stream that can be managed in a recording apparatus, or making the VOBUs to be observed as a stream based on MPEG at the time of connecting to a PC.

The present invention also aims to decrease amounts of calculation during post-recording of the MPEG system stream.

To achieve the purposes, an AV data recording apparatus of the present invention has a transport stream assembling section and a recording section. The transport stream assembling section divides an audio signal and a video signal into transport packets, and assembles the plural transport packets as a transport stream. The recording section records the transport stream. The recording section includes a logical block managing section to manage whether a logical block on a disk is used or not, a continuous data area detecting section to detect a continuous data area that ensures realtime continuous reproduction of an audio signal and a video signal, and a recording control section to determine a logical block number of the continuous data area on which the transport stream is to be recorded. The transport stream is recorded continuously on a plurality of continuous data areas detected by the continuous data area detecting section.

Accordingly, even realtime recording/realtime reproduction through a 1394 interface can be performed easily since there is no need to conduct any special stream conversion processes. At the same time, waste areas in the recording areas can be decreased and efficiency of recording can be improved. Moreover, continuous reproduction will be ensured during reproduction. Furthermore, at the time of connecting to a PC, the content can be observed efficiently as a file of a stream based on the MPEG standard.

Preferably, an AV data recording apparatus according to the present invention detects a continuous data area comprising a plurality of continuous logical blocks that enable recording at a maximum recording/reproducing rate in a period of time required to secure reproduction for the time of the maximum move of a reading/writing head at the continuous data area detecting section. Accordingly, a reading/writing head movement such as a seek will be allowed.

An AV data recording apparatus of the present invention preferably has a transport stream assembling section to divide an audio signal and a video signal into transport packets, configure the plural transport packets of a predetermined time length as a unit packet, and assemble a transport stream by aligning unit packets. As a result, efficient recording is executed in a form for easier management.

It is preferable for an AV data recording apparatus according to the present invention that a transport stream including transport packets based on digital broadcast using MPEG is assembled at a transport stream assembling section. As a result, functions of a digital apparatus using MPEG can be utilized.

For achieving the purposes, an AV data recording apparatus according to the present invention has a PES (Packetized Elementary stream) stream assembling section and a recording section. The PES stream assembling section divides an audio signal and a video signal into PES packets and assembles the plural PES packets as a PES stream. The recording section records the PES stream. The reading section includes a logical block managing section to manage whether a logical block on a disk is used or not, a continuous data area detecting section to detect a continuous data area that ensures a realtime continuous reproduction of the audio signal and the video signal, and a recording control section to determine a logical block number of a continuous data area on which the PES stream is to be recorded. The PES stream is recorded continuously on a plurality of the continuous data areas detected by the continuous data area detecting section.

This structure requires PES/TS conversion and TS/PES conversion. However, since such conversion process requires less time and efforts when compared with PS/TS conversion and TS/PS conversion for a program stream, connection through a 1394 interface can be provided with comparative ease.

Preferably, an AV data recording apparatus according to the present invention detects a continuous data area comprising a plurality of continuous logical blocks that enable recording at a maximum recording/reproducing rate in a period of time required to secure reproduction for the time of the maximum move of a reading/writing head at the continuous data area detecting section. Accordingly, a reading/writing head movement such as a seek will be allowed.

An AV data recording apparatus of the present invention preferably has a PES stream assembling section to divide an audio signal and a video signal into PES packets, configure the plural PES packets of a predetermined time length as a unit packet, and assemble a PES stream by aligning unit packets. As a result, efficient recording is executed in a form for easier management.

For achieving the above-mentioned purposes, an AV data recording apparatus of the present invention comprises a writing section to write data in a logical block on a disk, a reading section to read data recorded in a logical block, and a deletion control section to delete data by controlling the reading section and the writing section. The deletion control section deletes a part of data recorded as one file on a plurality of logical blocks by dividing the data into three areas comprising an effective data area before a deletion area, an effective data area within the last of logical blocks including the deletion area, and an effective data area following the last logical block, and closing forward undeleted effective data within the last block inside the last block so as to treat the three areas as one file.

Accordingly, as a forward closing process is not required for all effective data after the deletion area, the process efficiency can be improved considerably.

For achieving the above-mentioned purposes, an AV data recording apparatus of the present invention comprises a system stream assembling section to assemble an audio signal and a video signal as a system stream, and a recording section to record the system stream. The recording section comprises a logical block managing section to manage whether a logical block on a disk is used or not, a continuous data area detecting section to detect a continuous data area that ensures realtime continuous reproduction of the audio signal and the video signal, and a recording control section to determine a logical block number of the continuous data area on which the system stream is to be recorded. The AV data recording apparatus further comprises a post-recording control section to record a plurality of dummy data, the total size of which is equal to that of a logical block on a logical block at the same time that the system stream is recorded continuously on the plural continuous data areas detected by the continuous data area detecting section, and to replace only the dummy data with audio data at the time of post-recording.

Accordingly, as plural dummy data of a size of a logical block are replaced with audio data and any other extra process can be omitted, a process of reading an entire logical block and a process of partial rewriting within a logical block is not necessary. Thus, the processes are expected to decrease drastically.

Preferably in an AV data recording apparatus of the present invention, the post-recording control section records the system stream continuously on a plurality of the continuous data areas detected by the continuous data area detecting section, and at the same time, records a plurality of dummy data, the total size of which is larger than a logical block in at least one of the logical blocks, and only the dummy data included in a predetermined logical block are replaced with audio data at the time of post-recording. Accordingly, similar effects will be obtainable even if the size of the dummy packet is not an integral multiple of the size of the logical block.

For achieving the above-mentioned purposes, an AV data recording apparatus of the present invention comprises a writing section to write data in a logical block on a disk, a reading section to read data recorded in a logical block, and a deletion control section to delete data by controlling the reading section and the writing section. When the deletion control section deletes a part of data recorded as one file on a plurality of logical blocks, a first half and a latter half of the data are treated as one file. The first half comprises a dummy packet added to the back of an effective data area followed by the deletion area until data of the effective data area followed by the deletion area reaches a border of logical blocks, and the latter half comprises a dummy packet added to provide packets continuously before an effective data area following the deletion area.

Accordingly, as any forward closing process never will be required for effective data after the deletion area, the process efficiency can be improved drastically.

For achieving the above-mentioned purposes, an AV data recording apparatus of the present invention comprises a writing section to write data in a logical block on a disk, a reading section to read data recorded in a logical block, and a deletion control section to delete data by controlling the writing section and the reading section. When the deletion control section deletes a former part of data recorded as one file in a plurality of logical blocks by regarding this part as a deletion area and retaining a latter part as an effective data area, data comprising a dummy packet and the effective data area are treated as one file. The dummy packet is added to make the packets continuous before the effective data area, from a border of a logical block preceding the end of the deletion area to the end of the effective data area.

Accordingly, as forward closing processing is not required for the effective data following the deletion area, the process efficiency can be improved drastically.

For achieving the above-mentioned purposes, an AV data recording apparatus of the present invention comprises a writing section to write data in a logical block on a disk, and a management information writing section to write management information of the written data in a logical block. The management information writing section writes data management information comprising a starting position of the data on a logical block, length of the data, and identification of a logical block on which the data are written.

Accordingly, as freedom of the linkable areas is increased by the data management information, the writable area can be managed only with a pointer process without executing forward closing or padding of dummy data. Thus, the time and efforts of the process for adhering to a standard can be decreased.

For achieving the above-mentioned purposes, an AV data recording apparatus of the present invention comprises a writing section to write data in a logical block on a disk, a reading section to read data recorded in a logical block, and a deletion control section to delete data by controlling the writing section and the reading section. When the writing section writes data, it writes separately data management information comprising a starting position of the data in a logical block, a length of the data and identification of a logical block on which the data are written. The deletion control section deletes a part of data recorded as one file on a plurality of logical blocks by dividing the data into two areas: an effective data area before a deletion area and an effective data area following the deletion area, and by treating the two areas as one file.

Accordingly, as freedom of the linkable areas is increased by the data management information, the writable area can be managed only with a pointer process without executing forward closing or padding of dummy data at a time of data deletion. Thus, the time and efforts of the process for adhering to a standard can be decreased.

Preferably in an AV data recording apparatus of the present invention, a DIT packet additionally is inserted between the effective data area before the deletion area and the other effective area after the deletion area so as to record at the deletion control section. Accordingly, the DIT packet can be used as a trigger to detect that a stream of the effective data area after the deletion area is a new stream interrupted from a stream of the effective data area before the deleting area.

For achieving the above-mentioned purposes, an AV data recording apparatus of the present invention comprises a transport stream assembling section having transmission timing information and a recording section. The section for assembling a transport stream having transmission timing information assembles an transport stream having transmission timing information by dividing an audio signal and a video signal into transport packets and by repeating a set of the transport packet and transmission timing information for every transport packet. The recording section records the transport stream having transmission timing information, and it comprises a logical block managing section to manage whether a logical block on a disk is used or not, a continuous data area detecting section to detect a continuous data area that ensures a realtime continuous reproduction of the audio signal and the video signal, and a recording control section to determine a logical block number of the continuous data area on which the transport stream having transmission timing information is to be recorded. The transport stream having transmission timing information is recorded continuously on the plural continuous data areas detected by the continuous data area detecting section.

Accordingly, output through a 1394 interface can be executed only by a simple timing adjustment without newly generating output timing.

Preferably in an AV data recording apparatus of the present invention, the transport stream is assembled at the transport stream assembling section having transmission timing information, by dividing the audio signal and the video signal into the transport packets, configuring one unit packet by allocating repeatedly a set comprising a plurality of the transport packets for a predetermined time length and transmission timing information for every transport packet, and by aligning the unit packets. Accordingly, efficient recording can be performed in a form more suitable for management.

Preferably in an AV data recording apparatus of the present invention, the transport stream comprising the transport packets adhering to digital broadcast using MPEG is assembled at the section for assembling a transport stream having transmission timing information. Accordingly, functions of digital broadcast equipment using MPEG can be utilized.

Preferably in an AV data recording apparatus of the present invention, a counter value of 27 MHz is present as transmission timing information at the section for assembling a transport stream having transmission timing information. Also preferably, a counter value of 24.576 MHz is comprised as transmission timing information at the section for assembling a transport stream having transmission timing information. In a case of 27 MHz, a clock used in recording/reproducing a video or the like can be appropriated. In a case of 24.576 MHz, output timing can be adjusted easily since this value corresponds to the standard clock at the 1394 interface section.

For achieving the above-mentioned purposes, an AV data recording apparatus of the present invention comprises a receiving section for receiving a transport stream in real time from a channel, and also a recording section to record the transport stream. The recording section comprises a logical block managing section to manage whether a logical block on a disk is used or not, a continuous data area detecting section to detect a continuous data area that ensures realtime continuous reproduction of the transport stream, and a recording control section to determine a logical block number of the continuous data area on which the transport stream is to be recorded. The transport stream is recorded continuously on a plurality of the continuous data areas detected by the continuous data area detecting section.

Accordingly, no special stream conversion processes will be required even in a case of a realtime input through a 1394 interface, and thus, video recording can be executed with ease. At the same time, a waste area in the record area can be decreased and efficient recording will be realized. In addition, continuous reproduction is ensured at a time of reproduction. Furthermore, the stream can be observed as a stream adhering to the MPEG standard at the time of connecting to a PC.

For achieving the above-mentioned purposes, an AV data recording apparatus of the present invention comprises a receiving section for receiving a transport stream in real time from a channel, and a recording section to record a set comprising a transport packet and reception timing information as a continuous transport stream having a transmission timing information. The recording section comprises a logical block managing section to manage whether a logical block on a disk is used or not, a continuous data area detecting section to detect a continuous data area that ensures realtime continuous reproduction of the transport stream having transmission timing information, and a recording control section to determine a logical block number of the continuous data area on which the transport stream having transmission timing information is to be recorded. The transport stream having transmission timing information is recorded continuously on a plurality of the continuous data areas detected by the continuous data area detecting section.

Accordingly, no special stream conversion processes are required even if the realtime input through the 1394 interface is provided with transmission timing information, and thus, video recording can be executed with ease. In addition, continuous reproduction is ensured at a time of reproduction. Furthermore, the stream can be observed as a stream adhering to the MPEG standard at the time of connecting to a PC.

For achieving the above-mentioned purposes, an AV data reproducing apparatus of the present invention comprises a disk recorded by using an AV data recording apparatus described above, a reproducing section to read a transport stream recorded on a disk, a timing generating section to calculate timing for transmitting a transport stream in accordance with the MPEG standard, and a 1394 interface section to send transport packets onto a 1394 transmission channel. The 1394 interface section sends transport packets onto the 1394 transmission channel in accordance with transmission timing calculated at the transmission timing generating section.

Accordingly, realtime reproduction through a 1394 interface can be ensured.

For achieving the above-mentioned purposes, an AV data reproducing apparatus of the present invention comprises a disk recorded by using an AV data recording apparatus described above, a reproducing section to read a transport stream having transmission timing information recorded on a disk, a timing adjustment section to reproduce transmission timing in accordance with the transmission timing information of a transport stream having transmission timing information, and a 1394 interface section to send transport packets onto a 1394 transmission channel. The 1394 interface section sends transport packets onto the 1394 transmission channel in accordance with the transmission timing reproduced at the timing adjustment section.

Accordingly, realtime reproduction through a 1394 interface can be executed by using a transport stream having transmission timing information.

For achieving the above-mentioned purposes, an AV data recording method of the present invention comprises steps of dividing an audio signal and a video signal into transport packets and assembling a plurality of the transport packets as a transport stream, and recording the transport stream. The method further comprises steps of managing whether a logical block on a disk is used or not, detecting a continuous data area that ensures a realtime continuous reproduction of the audio signal and the video signal, and determining a logical block number of the continuous data area on which the transport stream is to be recorded. The transport stream is recorded continuously on the plural continuous data areas detected by the continuous data detecting section.

Accordingly, even realtime recording/realtime reproduction through a 1394 interface can be performed easily since there is no need to conduct any special stream conversion processes. At the same time, a waste area in the recording areas can be decreased and the efficiency of recording can be improved. Moreover, continuous reproduction will be ensured during reproduction. Furthermore, at the time of connecting to a PC, the content can be observed efficiently as a file of a stream based on the MPEG standard.

Preferably in an AV data recording method of the present invention, the continuous data area comprising plural continuous logical blocks that enable recording at a maximum recording/reproducing rate is detected during at least a period required for securing reproduction for a maximum move time of a reading/writing head in a step of detecting the continuous data area. Accordingly, a reading/writing head movement such as a seek will be allowed.

Preferably in an AV data recording method of the present invention, an audio signal and a video signal are divided into transport packets, the plural transport packets for a predetermined time length are configured as one unit packet, and the unit packets are aligned to assemble the transport stream. As a result, efficient recording is executed in a form for easier management.

Preferably in an AV data recording method of the present invention, the transport stream comprising transport packets adhering to digital broadcast using MPEG is assembled in a step of assembling the transport stream. Accordingly, functions of digital broadcast equipment using MPEG can be utilized.

For achieving the above-mentioned purposes, an AV data recording method of the present invention comprises steps of dividing an audio signal and a video signal into PES packets and assembling a plurality of the PES packets as a PES stream, and recording the PES stream. The method further comprises steps of managing whether a logical block on a disk is used or not, detecting a continuous data area that ensures realtime continuous reproduction of the audio signal and the video signal, and determining a logical block number of the continuous data area on which the PES stream is to be recorded. The PES stream is recorded continuously on the plural continuous data areas which have been detected.

This structure requires PES/TS conversion and TS/PES conversion. However, since such conversion process requires less time and effort when compared with PS/TS conversion and TS/PS conversion for a program stream, connection through a 1394 interface can be provided with comparative ease.

Preferably in an AV data recording method of the present invention, the continuous data area comprising the plural continuous logical blocks that enable recording at a maximum recording/reproducing rate during at least a period required for securing reproduction for a maximum move time of a reading/writing head is detected in a step of detecting the continuous data area. Accordingly, a reading/writing head movement such as a seek will be allowed.

Preferably in an AV data recording method of the present invention, an audio signal and a video signal are divided into PES packets, the plural PES packets for a predetermined time length are configured as one unit packet, and the unit packets are aligned to assemble the PES stream. As a result, efficient recording is executed in a form for easier management.

For achieving the above-mentioned purposes, an AV data recording method of the present invention comprises a step of deleting data by controlling a step of writing data in a logical block on a disk and a step of reading data recorded in a logical block. When a part of data recorded as one file on a plurality of logical blocks is deleted, the data is divided into three areas comprising an effective data area before the deletion area, an effective data area within the last of logical blocks including the deletion area, and an effective data area following the last logical block. Then, undeleted effective data present within the last logical block is closed forward within the last logical block, and the three areas are treated as one file.

Accordingly, as a forward closing process is not required for all effective data after the deletion area, process efficiency can be improved considerably.

For achieving the above-mentioned purposes, an AV data recording method of the present invention comprises steps of assembling an audio signal and a video signal as a system stream, and recording the system stream. The method further comprises steps of managing whether a logical block on a disk is used or not, detecting a continuous data area that ensures a realtime continuous reproduction of the audio signal and the video signal, and determining a logical block number of the continuous data area on which the system stream is to be recorded. Furthermore, at the same time that a system stream is recorded continuously on a plurality of the detected continuous data areas, a plurality of dummy data whose total size is equal to the logical block are recorded in the logical block, and only the dummy data are replaced with audio data at a time of post-recording.

Accordingly, as plural dummy data of a size of a logical block are replaced with audio data and any other extra process can be omitted, a process of reading an entire logical block and a process of partial rewriting within a logical block is not necessary. Thus, the processes are expected to decrease drastically.

Preferably in an AV data recording method of the present invention, during replacement of only the dummy data with audio data at the time of the post-recording, the system stream is recorded continuously on a plurality of the detected continuous data areas and at the same time, a plurality of dummy data that are larger in size than a logical block are recorded in at least one logical block, and only the dummy data included in a predetermined logical block are replaced with audio data at the time of post-recording. Accordingly, similar effects will be obtainable even if the size of the dummy packet is not an integral multiple of the size of the logical block.

For achieving the above-mentioned purposes, an AV data recording method of the present invention comprises a step of deleting data by controlling a step of writing data in a logical block on a disk and a step of reading data recorded in the logical block. When a part of data recorded as one file on a plurality of logical blocks is deleted, a first half and a latter half of the data are treated as one file. The first half comprises a dummy packet added to the back of an effective data area preceding the deletion area until data of an effective data area before the deletion area reaches a border of logical blocks, and the latter half comprises a dummy packet added to provide packets continuously before an effective data area after the deletion area, from the border of the logical block to the starting point of the effective data area following the deleted area.

Accordingly, as no forward closing processes will be required for effective data after the deletion area, the process efficiency can be improved drastically.

For achieving the above-mentioned purposes, an AV data recording method of the present invention comprises a step of deleting data by controlling a step of writing data in a logical block on a disk and a step of reading data recorded in a logical block. When a former part of data recorded as one file on a plurality of logical blocks is deleted as a deletion area and a latter part is retained as an effective data area, data comprising a dummy packet and the effective data area are treated as one file. The dummy packet is added so that the packets will be continued before the effective data area, from a border of a logical block preceding the end of the deletion area to the end of the effective data area.

Accordingly, as forward closing processing is not required for the effective data following the deletion area, the process efficiency can be improved drastically.

For achieving the above-mentioned purposes, an AV data recording method of the present invention comprises steps of writing data in a logical block on a disk and writing information for managing the written data in a logical block. In the step of writing information for data management, the data management information comprising a starting position of the data on a logical block, length of the data, and identification of a logical block on which the data have been written, will be written.

Accordingly, as freedom of the linkable areas is increased by the data management information, the writable area can be managed only with a pointer process without executing forward closing or padding of dummy data. Thus, the time and effort of the process for adhering to a standard can be decreased.

For achieving the above-mentioned purposes, an AV data recording method of the present invention comprises a step of deleting data by controlling a step of writing data in a logical block on a disk and a step of reading data recorded in a logical block. In the data writing step, data management information comprising a starting position of the data in a logical block, a length of the data and identification of a logical block on which the data are written, are written separately. When a part of data recorded as one file on a plurality of logical blocks is deleted in the data deleting step, the data are divided into two areas: an effective data area before a deletion area and an effective data area after the deletion area, and the two areas are treated as one file.

Accordingly, as freedom of the linkable areas is increased by the data management information, the writable area can be managed only with a pointer process without executing forward closing or padding of dummy data at a time of data deletion. Thus, the time and effort of the process for adhering to a standard can be decreased.

Preferably in an AV data recording method of the present invention, a DIT packet of DVB standard additionally is inserted between the effective data areas before the deletion area and the other effective area after the deletion area for the purpose of recording. Accordingly, the DIT packet can be used as a trigger to detect that a stream of the effective data area after the deletion area is a new stream interrupted from a stream of the effective data area before the deleting area.

For achieving the above-mentioned purposes, an AV data recording method of the present invention comprises steps of assembling a transport stream having transmission timing information by dividing an audio signal and a video signal into transport packets, and by repeating a set of the transport packets and transmission timing information for every transport packet, and also recording the transport stream having transmission timing information. The method further comprises steps of managing whether a logical block on a disk is used or not, detecting a continuous data area that ensures realtime continuous reproduction of the audio signal and the video signal, and determining a logical block number of the continuous data area on which the transport stream having transmission timing information is to be recorded. The transport stream having transmission timing information is recorded continuously on the plural continuous data areas detected by the continuous data detecting section.

Accordingly, output through a 1394 interface can be executed only by a simple timing adjustment without newly generating output timing.

Preferably in an AV data recording method of the present invention, a transport stream is assembled by dividing an audio signal and a video signal into transport packets, configuring one unit packet by allocating repeatedly a set comprising a plurality of the transport packets for a predetermined time length and transmission timing information for every transport packet, and by aligning the unit packets. Accordingly, efficient recording can be performed in a form more suitable for management.

Preferably in an AV data recording method of the present invention, the transport stream comprising the transport packets based on digital broadcast using MPEG is assembled, since it also can be utilized suitably for a digital broadcast standard using MPEG.

Preferably in an AV data recording method of the present invention, a counter value of 27 MHz is used as transmission timing information. It is also preferable that a counter value of 24.576 MHz is used as transmission timing information. In a case of 27 MHz, a clock used in recording/reproducing a video or the like can be appropriated. In a case of 24.576 MHz, output timing can be adjusted easily since this value corresponds to the standard clock at the 1394 interface section.

For achieving the above-mentioned purposes, an AV data recording method of the present invention comprises steps of receiving a transport stream in real time from a channel, and recording the transport stream. The method further comprises steps of managing whether a logical block on a disk is used or not, detecting a continuous data area that ensures realtime continuous reproduction of the transport stream, and determining a logical block number of the continuous data area on which the transport stream is to be recorded. The transport stream is recorded continuously on a plurality of the continuous data areas that have been detected.

Accordingly, no special stream conversion processes will be required even in a case of a realtime input through a 1394 interface, and thus, video recording can be executed with ease. At the same time, a waste area in the record area can be decreased and efficient recording will be realized. In addition, continuous reproduction is ensured at a time of reproduction. Furthermore, the stream can be observed as a stream adhering to the MPEG standard at the time of connecting to a PC.

For achieving the above-mentioned purposes, an AV data recording method of the present invention comprises steps of receiving a transport stream in real time from a channel, and recording a set of a transport packet and reception timing information as a continuous transport stream having a transmission timing information. The method further comprises steps of managing whether a logical block on a disk is used or not, detecting a continuous data area that ensures realtime continuous reproduction of the transport stream having transmission timing information, and determining a logical block number of the continuous data area on which the transport stream having transmission timing information is to be recorded. The transport stream having transmission timing information is recorded continuously on a plurality of the continuous data areas that have been detected.

Accordingly, no special stream conversion processes are required even if the realtime input through the 1394 interface is provided with transmission timing information, and thus, video recording can be executed with ease. In addition, continuous reproduction is ensured at a time of reproduction. Furthermore, the stream can be observed as a stream adhering to the MPEG standard at the time of connecting to a PC.

For achieving the above-mentioned purposes, an AV data reproducing method of the present invention comprises steps of: reading a transport stream on a disk recorded by using an AV data recording method described above, calculating a timing for transmitting the transport stream in accordance with the MPEG standard, and sending the transport packets onto a 1394 transmission channel. In the method, the transport packets are sent onto the 1394 transmission channel in accordance with calculated transmission timing.

Accordingly, realtime reproduction through a 1394 interface can be ensured.

For achieving the above-mentioned purposes, an AV data reproducing method of the present invention comprises steps of: reading a transport stream having transmission timing information recorded on a disk by using an AV data recording method described above, reproducing a timing for transmitting in accordance with transmission timing information of the transport stream having transmission timing information, and sending the transport packets onto a 1394 transmission channel. In the method, the transport packets are sent onto the 1394 transmission channel in accordance with the reproduced transmission timing.

Accordingly, realtime reproduction through a 1394 interface can be executed by using a transport stream having transmission timing information.

BRIEF DESCRIPTION OF THE DRAWINGS

FIG. 8 is a diagram showing numerical values related to an allocation descriptor of a file entry before a deletion operation in an AV data recording apparatus in Embodiment 2 of the present invention.

FIG. 9 is a diagram showing numerical values related to an allocation descriptor of a file entry after a deletion operation in an AV data recording apparatus in Embodiment 2 of the present invention.

FIG. 18 is a diagram showing numerical values related to an allocation descriptor of a file entry before a deletion operation in an AV data recording apparatus in Embodiment 4 of the present invention.

FIG. 19 is a diagram showing numerical values related to an allocation descriptor of a file entry after a deletion operation in an AV data recording apparatus in Embodiment 4 of the present invention.

FIG. 24 is a diagram showing figures related to an allocation descriptor of a file entry before a deletion operation in an AV data recording apparatus in Embodiment 5 of the present invention.

FIG. 25 is a diagram showing figures related to an allocation descriptor of a file entry after a deletion operation in an AV data recording apparatus in Embodiment 5 of the present invention.

FIG. 34 is a diagram exemplifying a record form of a transport stream.

BEST MODE FOR CARRYING OUT THE INVENTION

Hereinafter, embodiments of the present invention will be described with reference to the drawings.

Embodiment 1

Figure 1:
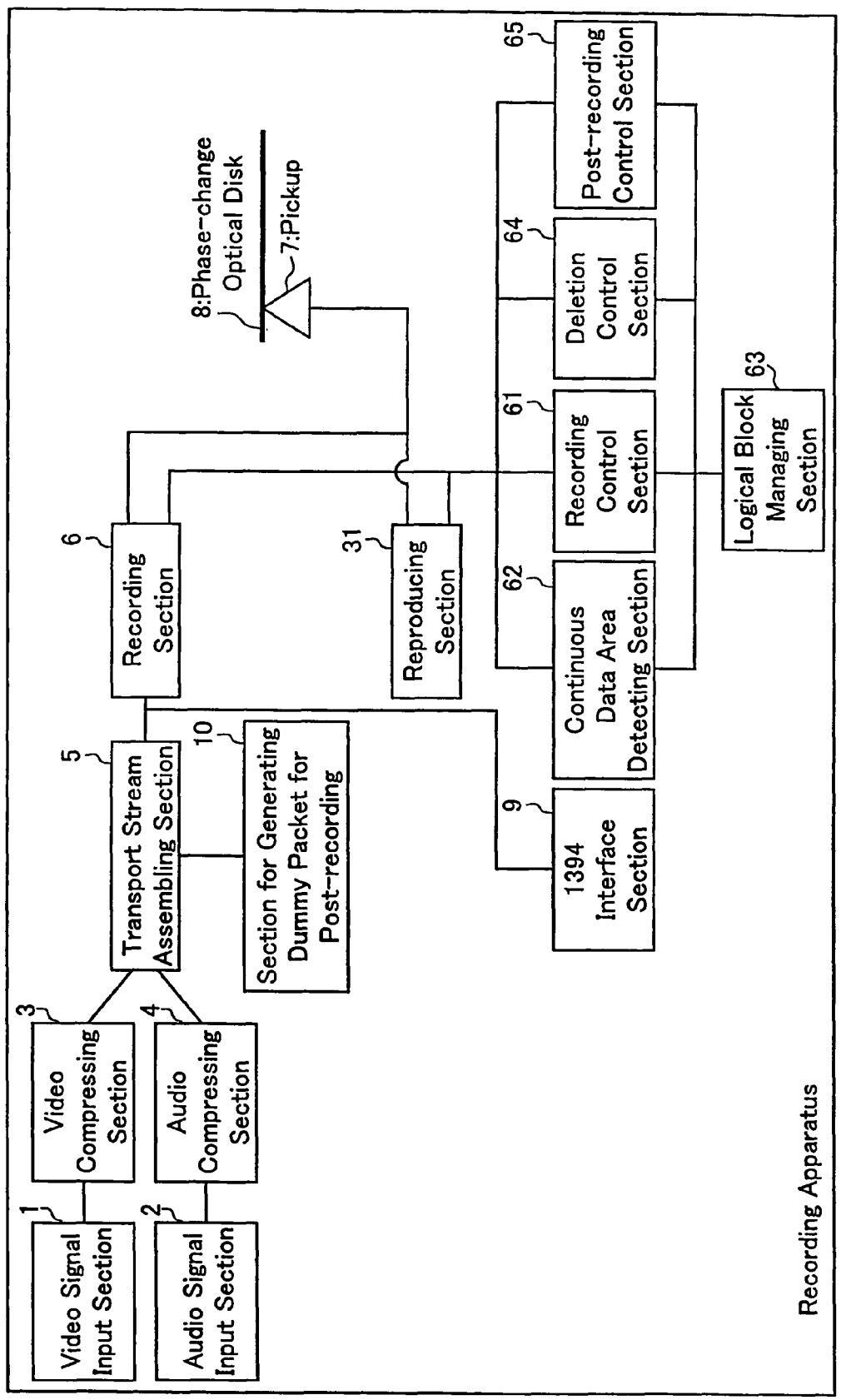
FIG. 1 is a diagram showing a structure of an AV data recording apparatus in Embodiment 1 of the present invention.

FIG. 1 is a diagram showing a block structure of an AV data recording apparatus in Embodiment 1 of the present invention. In FIG. 1, signals inputted at a video signal input section 1 and an audio signal input section 2 are compressed respectively at a video compressing section 3 and an audio compressing section 4. The compressed signals are formed to be a transport stream at a transport stream assembling section 5 and written on a phase-change optical disk 8 via a recording section 6 and a pickup 7.

When video signals are inputted and recorded via a 1394 interface, the video signal of a transport stream form inputted from outside into the 1394 interface section 9 is recorded on the phase-change optical disk 8 via the recording section 6 and the pickup 7.

For recording a video signal, a recording control section 61 controls the recording section 6. In addition to that, the recording control section 61 makes a continuous data area detecting section 62 to detect free areas that are physically continuous. The continuous data area detecting section 62 searches the use condition of each logical block (and each sector) managed by a logical block managing section 63 in order to detect free areas.

Specifically, in an operation to start recording, the transport stream assembling section 5 divides the compressed video signal and the compressed audio signal into a transport packet V_TSP and A_TSP of 188 byte units (V_TSP denotes a video transport packet for storing video data and A_TSP denotes an audio transport packet for storing audio data), and aligns these two types of transport packets in order to configure a VOBU and sends them to the recording section 6.

At the recording section 6, recording of VOBU starts at a location with a logical number determined by the recording control section 61. At this time, a VOBU is divided into 32 kbyte units at the recording section 6, and the 32 kbyte units are provided with error correction codes so as to be recorded as one logical block on a phase-change optical disk 8.

When recording of one VOBU is completed during one logical block is being processed, a following VOBU is recorded sequentially without providing any spacing.

A continuous free logical block area of at least 11 seconds at a maximum recording/reproducing rate calculation is detected by the continuous data area detecting section 62 before the recording at the recording section 6 starts. A corresponding logical block number is notified to the recording section 6 every time that writing of a logical block unit occurs, and the logical block managing section 63 is notified that a logical block has been used.

The continuous data area detecting section 62 searches the use condition of a logical block that is managed within a logical block managing section, and detects an area where unused logical blocks continue for 11 seconds at the maximum recording/reproducing rate calculation. Here, a data reading rate of the reproducing section, a maximum data recording/reproducing rate (rate for recording/reproducing a video) and a maximum move time of a pickup are considered the same as in conventional technologies.

A continuous free logical block area of at least 11 seconds is detected at all times to secure a continuous reproduction, but any other techniques can be taken without being limited thereto.

For example, a data size of continuous free logical blocks can be determined dynamically while calculating and tracing storing amounts of extra reproduction data. That is, when a continuous data area for 17 seconds is secured at a certain point of time during photographing, a following continuous data area for 5 seconds will be retained in a recording method to ensure a continuous reproduction.

The logical block managing section 63 comprehends a use condition for every logical block number by using used logical block numbers notified by the recording control section 61, and executes management. That is, the use condition of each sector unit composing the logical block number is managed by recording whether it has been used or not, using a space bit descriptor area defined by a UDF or a ISO/IEC 13346 file structure. And a FID and a file entry are written into a file management area on a disk at a final stage of a recording process.

Figure 2:
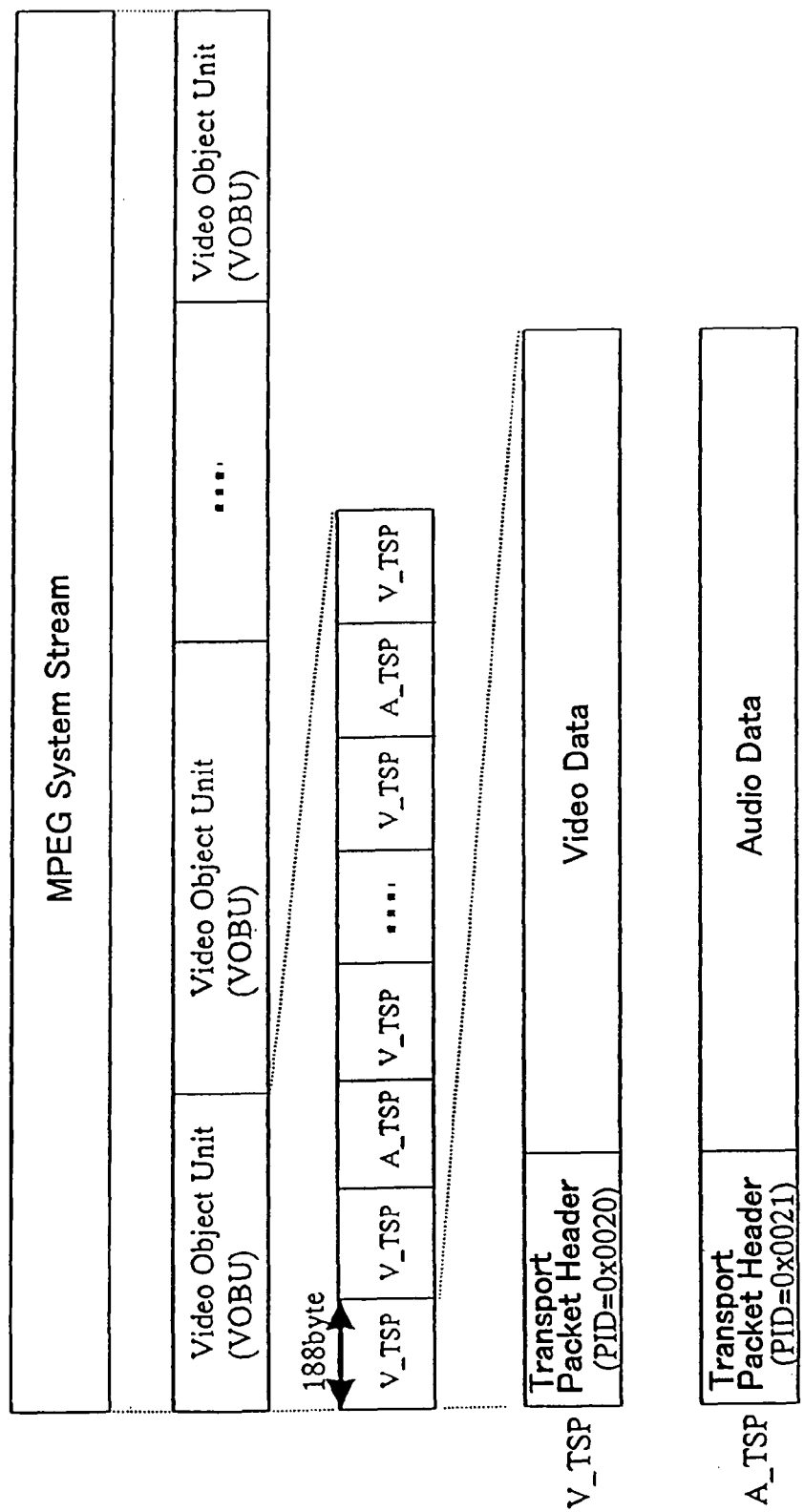
FIG. 2 is a diagram showing a recording form of an AV data recording apparatus in Embodiment 1 of the present invention.

Next, FIG. 2 is a diagram showing a recording form of an AV data recording apparatus in Embodiment 1 of the present invention. In FIG. 2, a MPEG system stream is composed of a plurality of VOBUs continuing with no spacing. One VOBU corresponds to a recorded content for 0.4 to 1 second and it is composed of MPEG transport packets continuing with no spacing.

Figure 28:
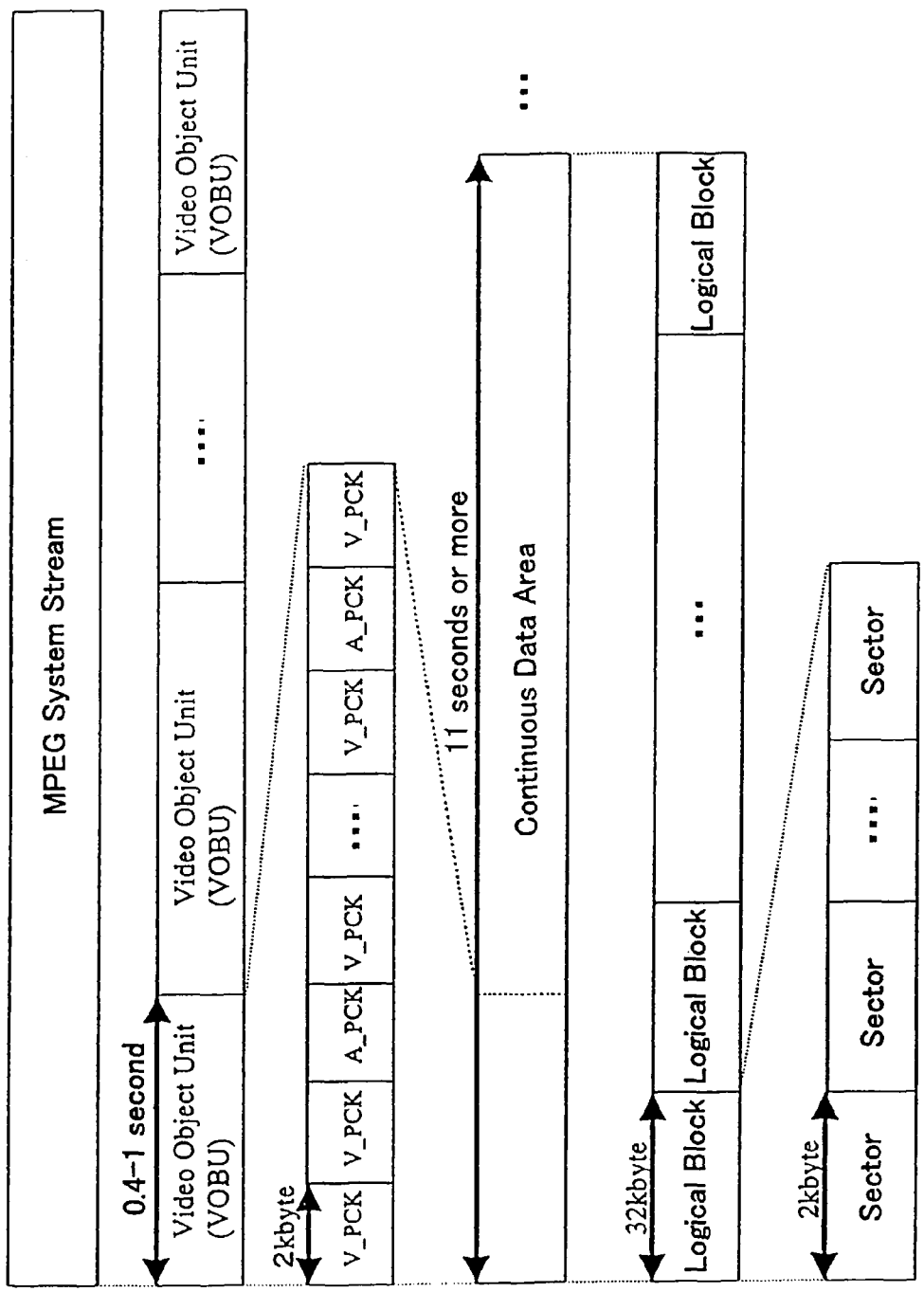
FIG. 28 is a diagram showing a recording format in a case of recording a video on a DVD-RAM in real time.
Figure 29:
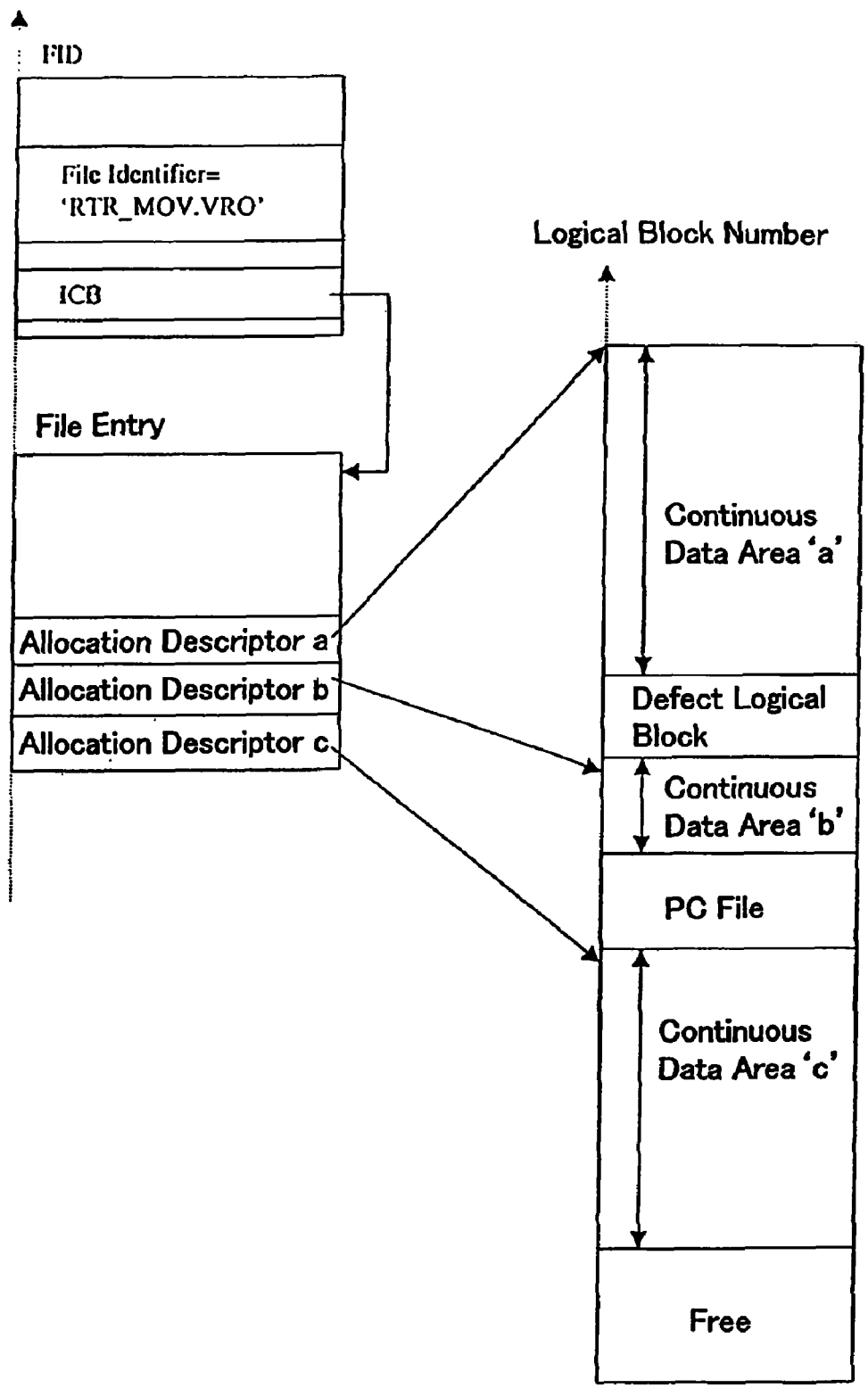
FIG. 29 is a diagram showing that a content recorded on a DVD-RAM is managed by an UDF or an ISO/IEC 13346 file system.

The transport packets are classified into two types: a video transport packet (V_TSP) to store video data and an audio transport packet (A_TSP) to store audio data. Each transport packet is 188 bytes in length. The V_TSP is composed of a transport packet header and video data while the A_TSP is composed of an audio packet header and video data. The V_TSP and the A_TSP can be identified from each other with PID (packet ID) in the transport packet headers. PID of the V_TSP is "0x0020" while PID of the A_TSP is "0x0021". The relationship between a VOBU and a continuous data area, a logical block and a sector is same as that shown in FIG. 28.

Figure 3:
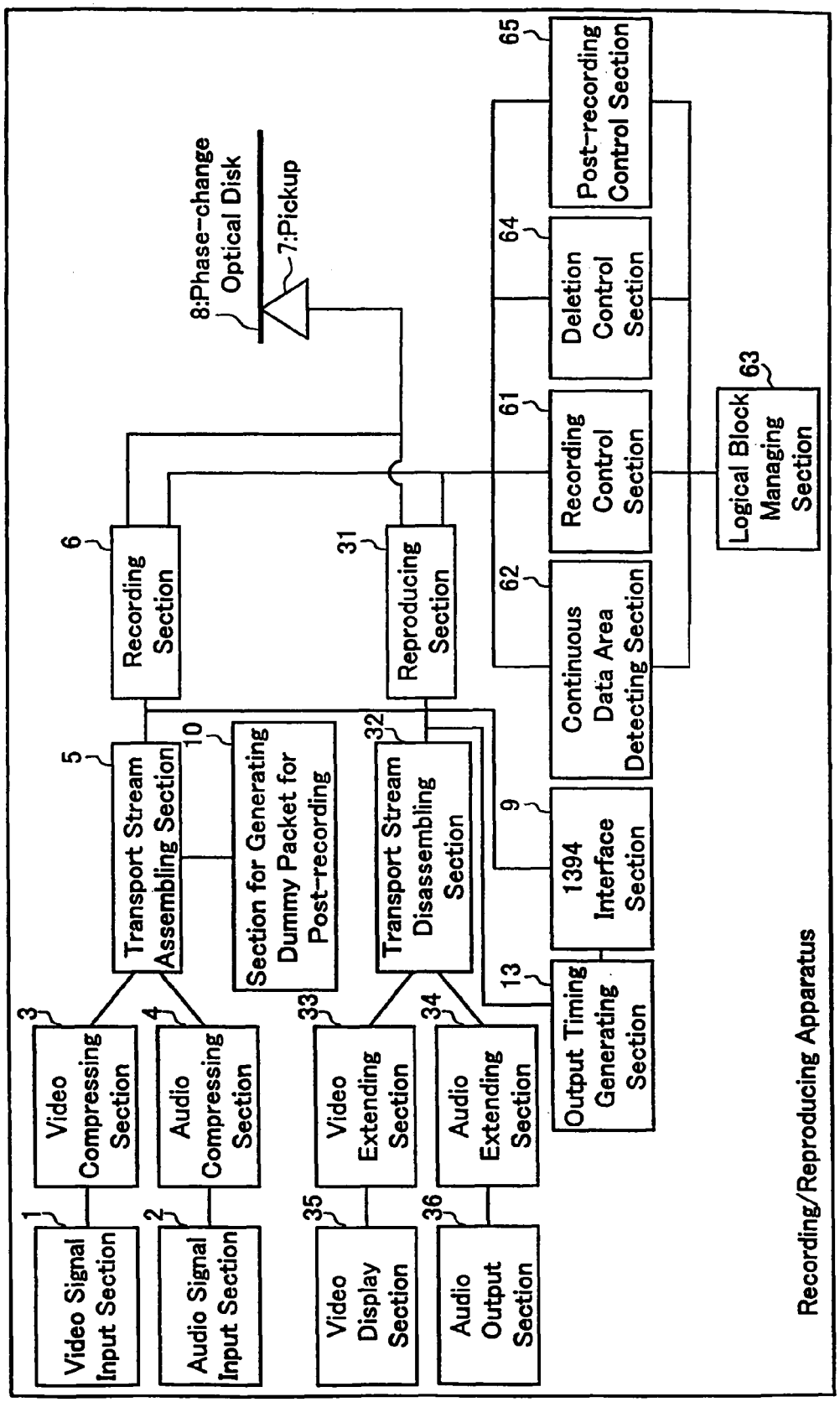
FIG. 3 is a diagram showing a structure of an AV data recording/reproducing apparatus in an example of the present invention.

When recorded data are reproduced, as shown in FIG. 3, a transport stream taken out via the pickup 7 and the reproducing section 31 is divided at a transport stream disassembling section 32 into a video signal and an audio signal. The signals are outputted respectively to a video display section 35 and an audio output section 36 through a video extending section 33 and an audio extending section 34.

When a set top box (STB) is connected to the 1394 interface in order to transmit a recorded video to the set top box and to reproduce the video at the set top box side, a transport stream outputted at the reproducing section 31 is sent to the 1394 interface section 9 as it is via an output timing generating section 13.

The output timing generating section 13 schedules and generates output timing of each transport packet in compliance with a decoder model of a MPEG standard (transport stream system target decoder) and sends each transport packet with the timing to the 1394 interface section 9.

The 1394 interface section 9 keeps the time interval between packets at the time of receiving the respective transport packets and transmits it to a 1394 transmission channel. In a MPEG standard decoder model, it is defined to transmit transport packets so that a buffer memory for receiving transport packets at the set top box side will not overflow or underflow.

When recorded data are displayed at the video display section 35 and also when the data are reproduced at the set top box side via the 1394 interface section 9, the transport stream is recorded in an area designated by the continuous data area detecting section 62, so that a continuous reproduction is ensured.

As mentioned above, Embodiment 1 can provide an easy and efficient manner both ensuring a realtime recording/realtime reproduction by using a video isochronous transmission means via a digital interface and also ensuring file reproduction by using a means for asynchronous transmission at the time of connecting to a PC, due to the following reasons: no special stream conversion process is required when the 1394 interface is used; recording is executed in a condition in which a continuous reproduction is ensured; there is no waste area in the recording area; and it can be observed as a data file based on a MPEG standard when connecting to a PC.

When a recorded video signal file or the like is deleted, a deletion control section 64 controls both the recording section 6 and the reproducing section 31 for executing the deletion process. Furthermore, in a case of post-recording, a post-recording control section 65 controls the recording section 6 and the reproducing section 31 in order to complete the post-recording process. For carrying out a post-recording after a recording, a video should be recorded previously while driving a section 10 that generates dummy packets for post-recording. For an actual deletion and post-recording, reproducing functions (e.g., a reproducing section) should be driven to read data of a logical block.

Figure 35:
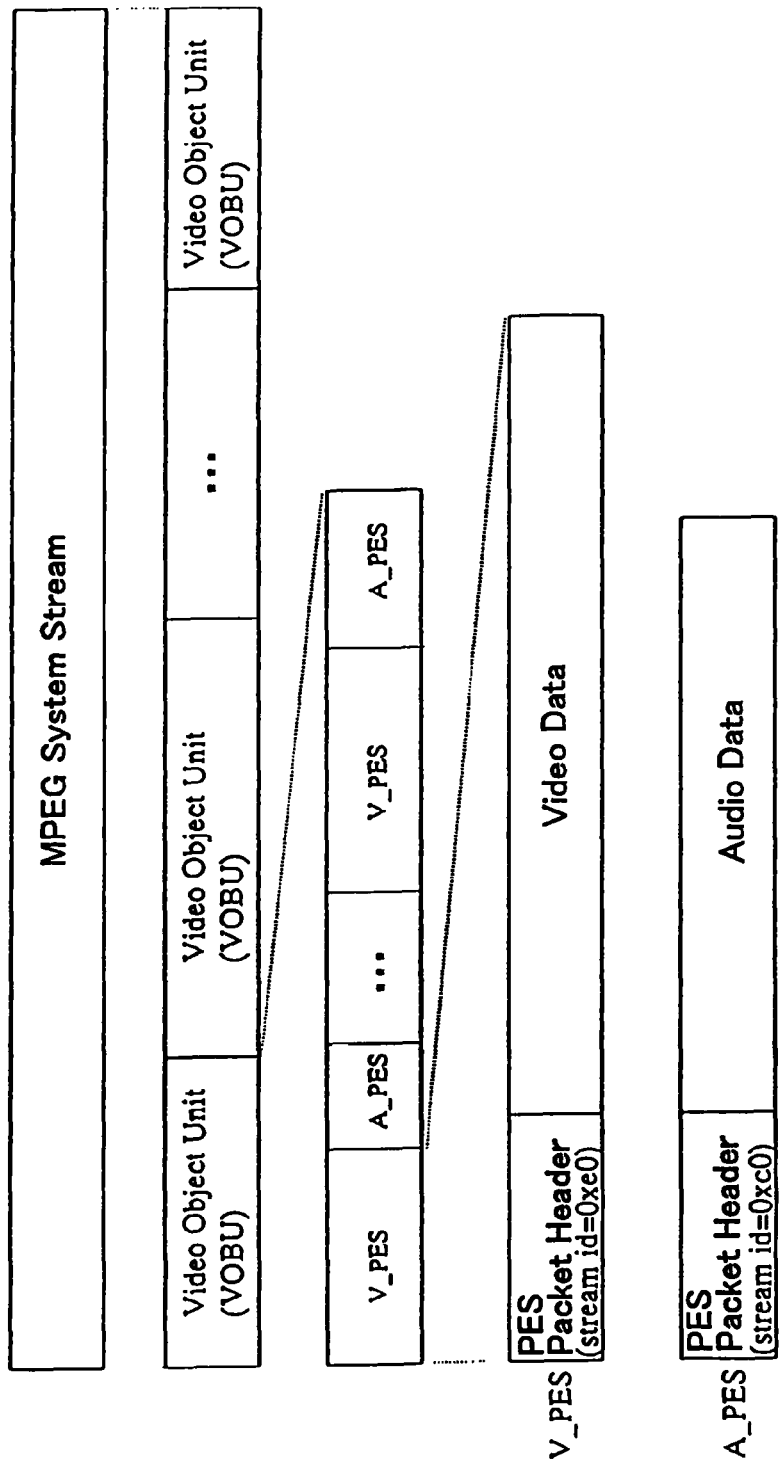
FIG. 35 is a diagram showing a recording form of an AV data recording apparatus in an example of the present invention.

A transport stream is recorded in Embodiment 1, but it can be a PES stream composed of PES packets having an arbitrary packet length as shown in FIG. 35.

For recording a PES stream, a PES/TS conversion and a TS/PES conversion are required when inputting/outputting via a 1394 interface is executed. However, such a conversion process is simple in a comparison with a PS/TS conversion and TS/PS conversion required for a program stream, since the PS/TS conversion and the TS/PS conversion are equivalent respectively to a PS/PES/TS conversion and a TS/PES/PS conversion. In place of a transport stream assembling section and a disassembling section, a PES assembling section and a disassembling section are required.

In Embodiment 1, though audio is predicted to be compressed, no serious problems will occur even if audio is incorporated without being compressed in a system stream.

In Embodiment 1, the digital interface is explained as a transmission channel based on a 1394 standard in Embodiment 1. However, this is not intended to be limited thereto as long as it allows isochronous transmission and asynchronous transmission of MPEG data.

Embodiment 2

Figure 4:
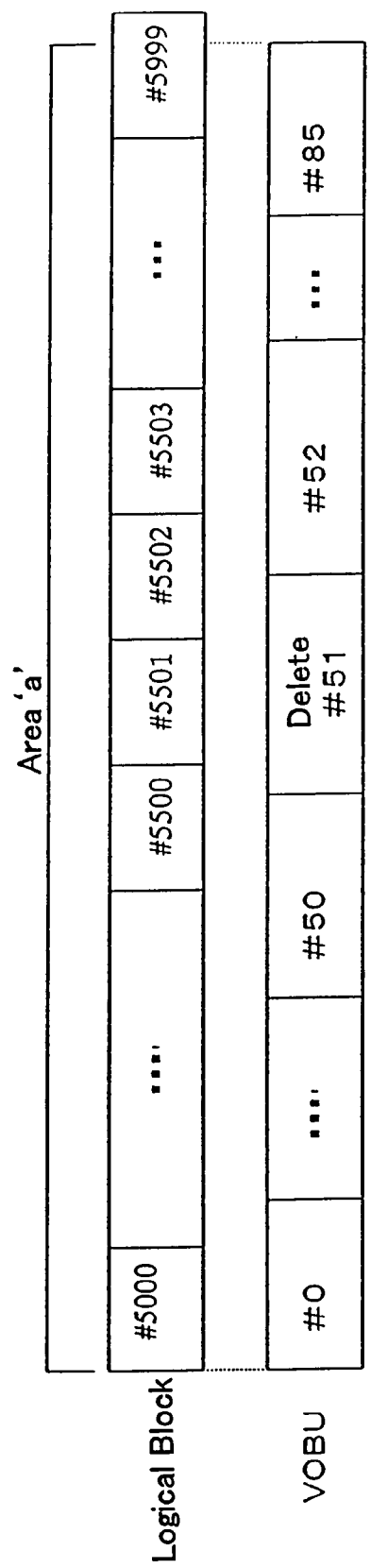
FIG. 4 is a diagram showing a recorded content in an AV data recording apparatus before a deletion operation in Embodiment 2 of the present invention.

The following explanation is about a case where a user deletes a specific VOBU of a recorded video. FIG. 4 is a diagram showing a content recorded in a AV data recording apparatus in Embodiment 2 of the present invention before a deletion operation. In FIG. 4, data are recorded in a range of logical blocks #5000-5999, and VOBU#0-VOBU#85 are recorded in the logical blocks. Here, the recorded logical blocks are regarded as an area 'a' as a whole. The user will reproduce a recorded video to designate VOBU#51 for a part to be deleted. The VOBU#51 to be deleted is recorded in the logical blocks of #5500, #5501 and #5502.

Figure 5:
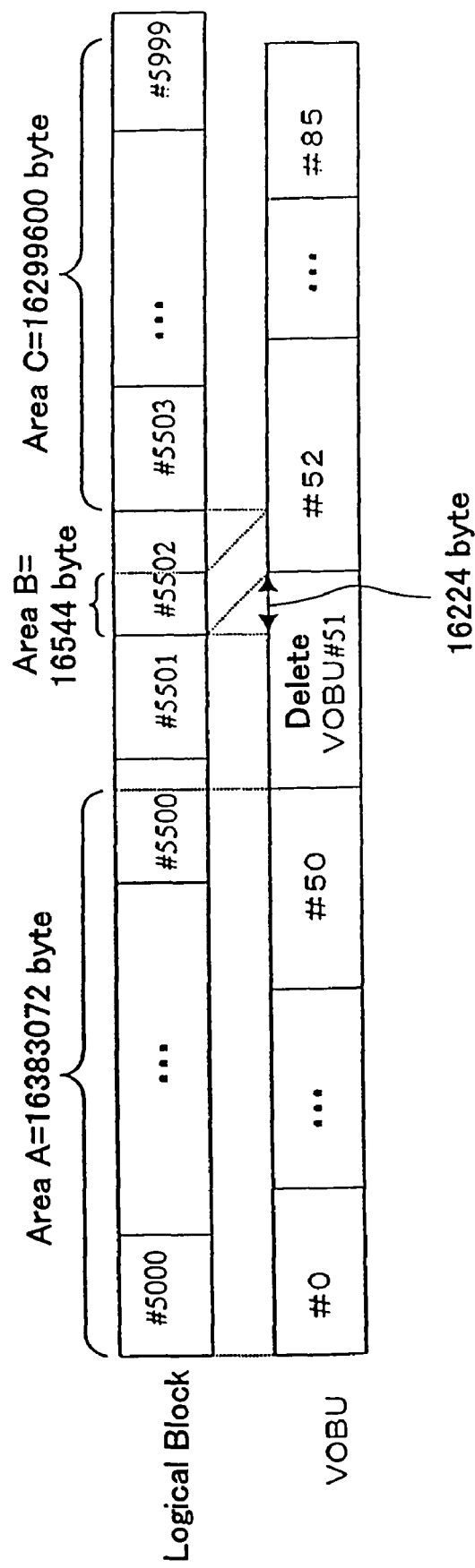
FIG. 5 is a diagram showing a recorded content in an AV data recording apparatus after a deletion operation in Embodiment 2 of the present invention.

FIG. 5 is a diagram showing a content that is recorded after a deletion operation in an AV data recording apparatus in Embodiment 2 of the present invention. In FIG. 5, logical blocks #5000-#5500 and #5502-#5999 include recorded data, while a logical block #5501 becomes a free area (unused). In the logical blocks VOBU#0-#50 and VOBU#52-#85 are recorded, and VOBU#51 has been deleted from the recorded content. Here, video data parts of logical blocks #5000-#5500, a logical block #5502, and logical blocks #5503-#5999 are regarded respectively as an area A, an area B and an area C.

Figure 6:
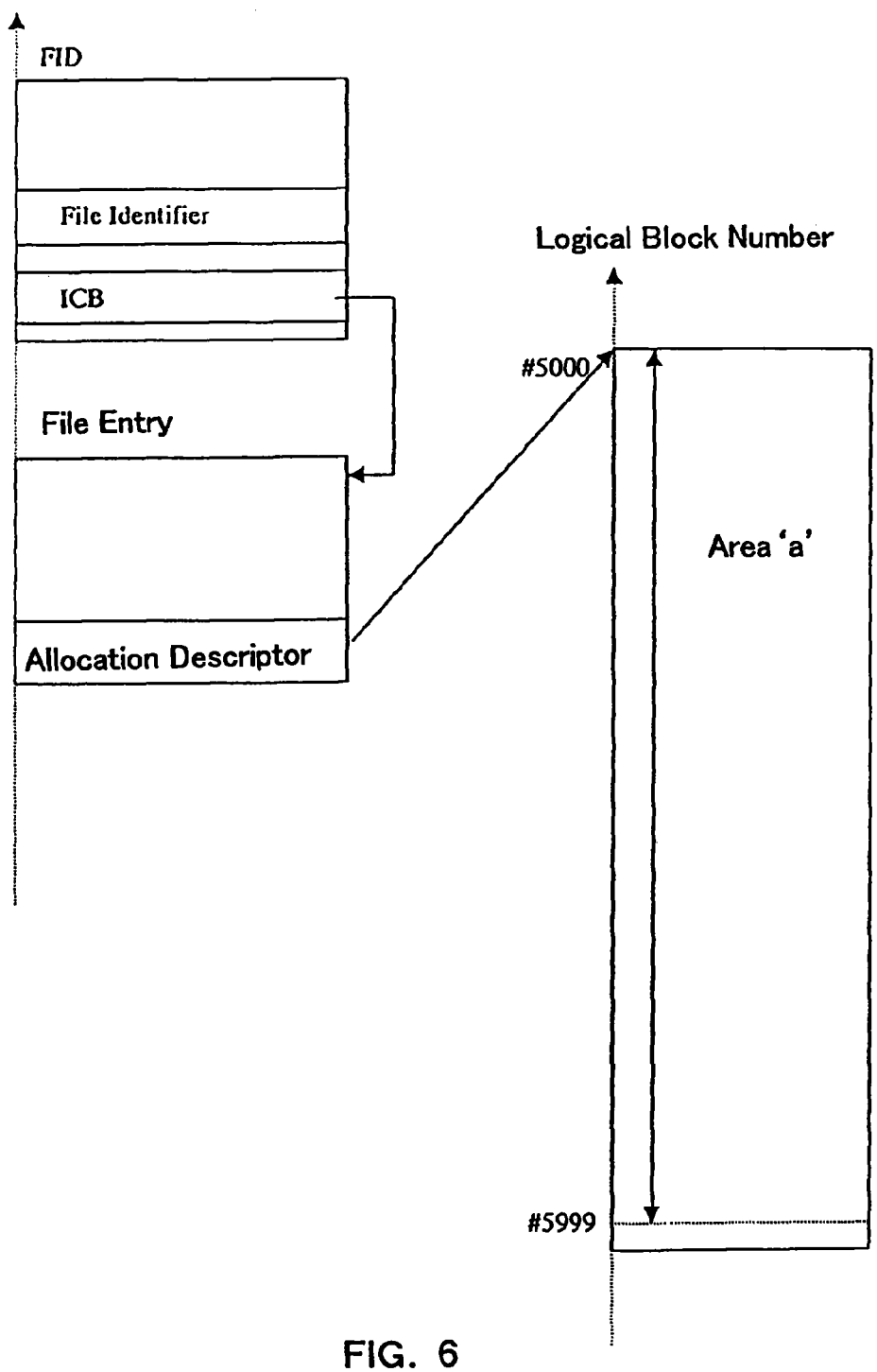
FIG. 6 is a diagram showing a structure of a recorded content file before a deletion operation in an AV data recording apparatus in Embodiment 2 of the present invention.

FIG. 6 is a diagram showing a file structure that has been recorded in an AV data recording apparatus in Embodiment 2 of the present invention before a deletion operation. A content recorded in the area 'a' in FIG. 4 (logical blocks #5000-#5999) is indicated as being linked to a file entry by an allocation descriptor.

Figure 7:
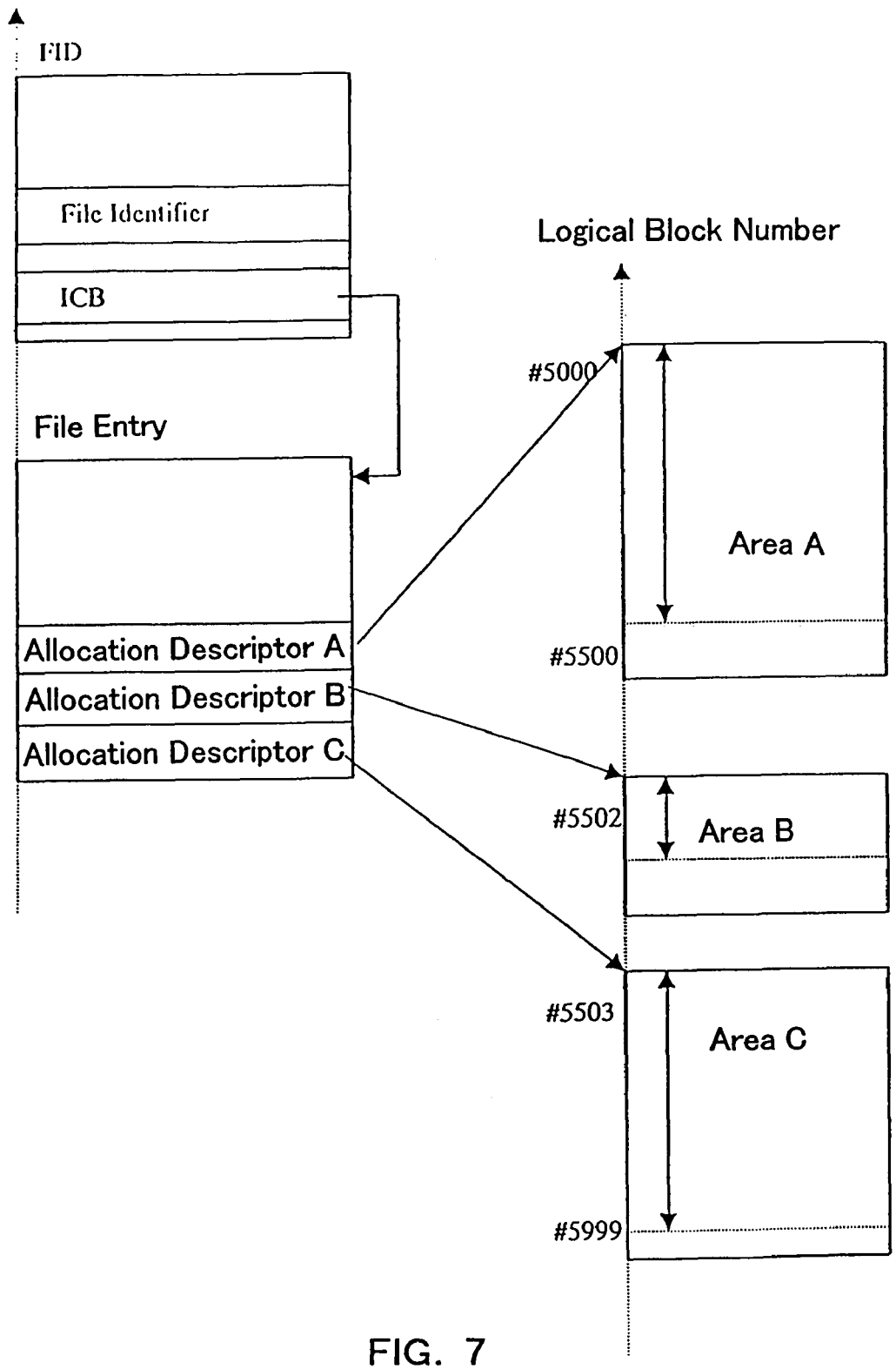
FIG. 7 is a diagram showing a structure of a recorded content file after a deletion operation in an AV data recording apparatus in Embodiment 2 of the present invention.

FIG. 7 is a diagram showing a structure of a file that has been recorded after a deletion operation in an AV data recording apparatus in Embodiment 2 of the present invention. In FIG. 7, the recorded contents of the areas A, B and C in FIG. 5 are linked to a file entry by three allocation descriptors.

Figure 30A:
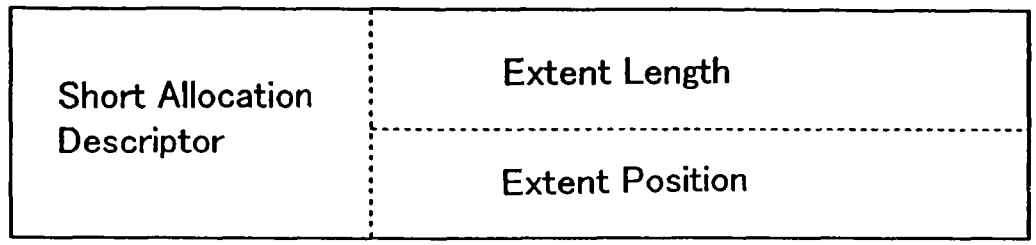
FIGS. 30A and 30B are diagrams showing structures of allocation descriptors.
Figure 30B:
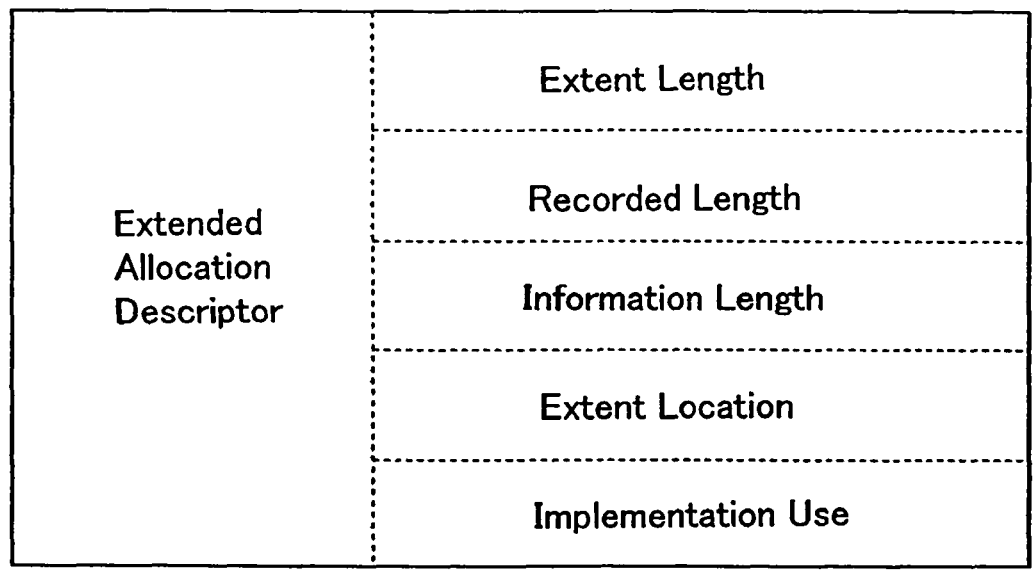
Figure 31:
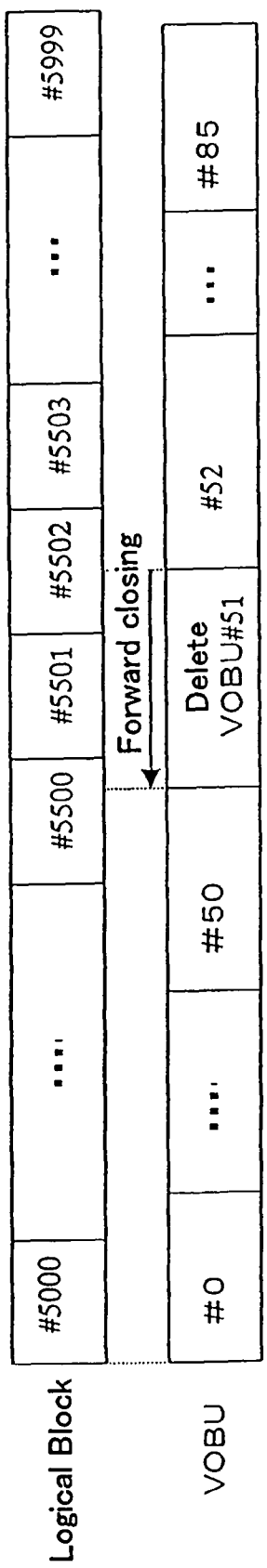
FIG. 31 is a diagram showing a recorded content before a deletion operation of a recorded file on a DVD-RAM.
Figure 32:
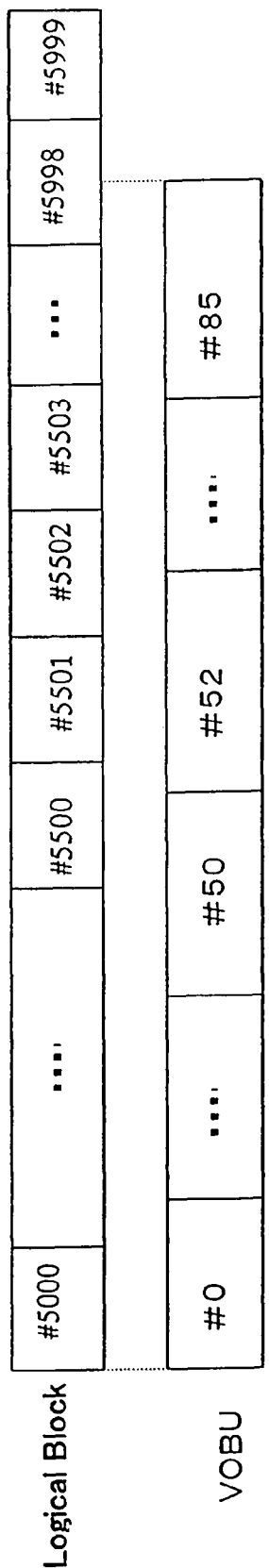
FIG. 32 is a diagram showing a recorded content after a deletion operation of a recorded file on a DVD-RAM.
Figure 33:
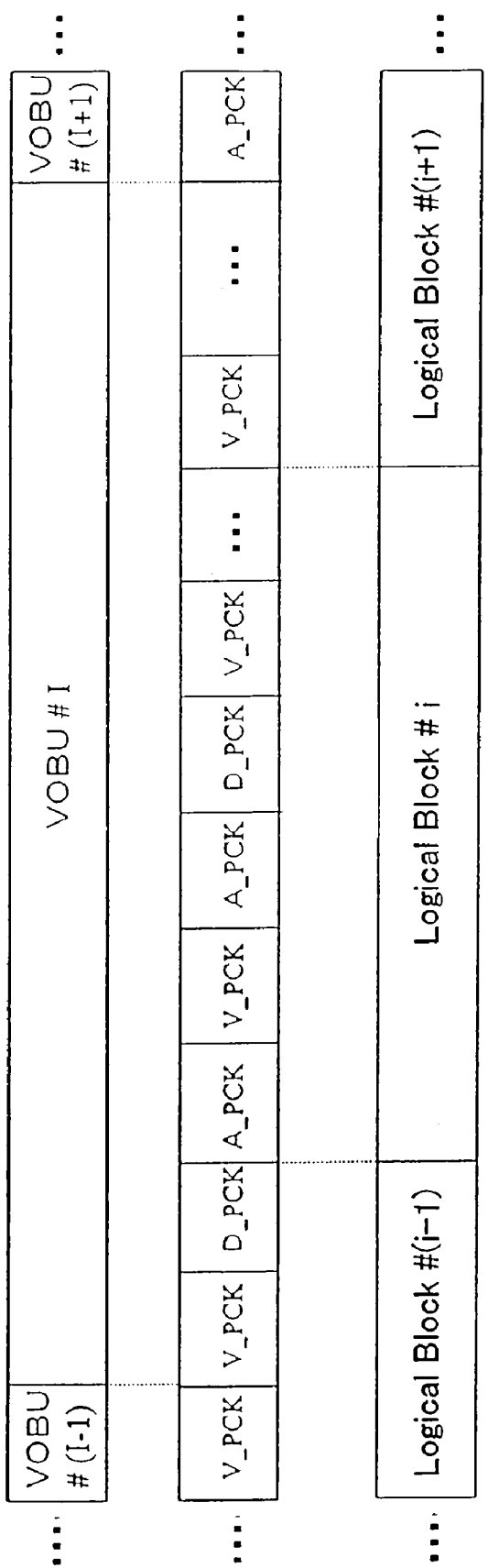
FIG. 33 is a diagram showing a recorded content in an AV data recording/reproducing apparatus using DVD-RAM, which will be post-recorded.

FIG. 8 is a diagram showing numerical values concerning an allocation descriptor of a file entry before a deletion operation in the AV data recording apparatus in Embodiment 2 of the present invention. In this embodiment, an extended allocation pointer shown in FIG. 30B is used for an allocation descriptor. The extent location indicates a head sector number of the area 'a' in FIG. 4, and also a sector number "80000" corresponding to the logical block #5000. Regarding data length of a file, a record length and an extent length indicate 32766144 bytes. Since an allocation descriptor has 20 bytes, an allocation descriptor length is '20'. Since data are not compressed in the Embodiment 2, the information length used here has a value equal to the record length, and an 'implementation use' is not used. Therefore, a detailed explanation of these fields will be omitted from the following description.

FIG. 9 is a diagram showing numerical values concerning an allocation descriptor of a file entry after a deletion operation in an AV data recording apparatus in Embodiment 2 of the present invention. Here also, the extended allocation pointers of FIG. 30B are used for the allocation descriptors. Extent locations of the allocation descriptors A, B and C indicate respectively the head sector numbers of the areas A, B and C in FIG. 5, and also sector numbers "80000", "88032", "88048" corresponding to the logical blocks #5000, #5502, and #5503. The recorded lengths of the allocation descriptors A, B and C indicate effective data lengths: 16383072 bytes, 16544 bytes and 16299600 bytes respectively. Extent locations of the allocation descriptors A and B are indicated as a length of a range including effective data shown as integral multiples of 2048 bytes: 16384000 bytes and 18432 bytes respectively. On the other hand, the extent location of the allocation descriptor C is not necessarily an integral multiple of 2048 bytes according to the standard, and therefore it is equal to 16299600 bytes of the recorded length. Since three application descriptors are used, the allocation descriptor length becomes '60'.

Figure 10:
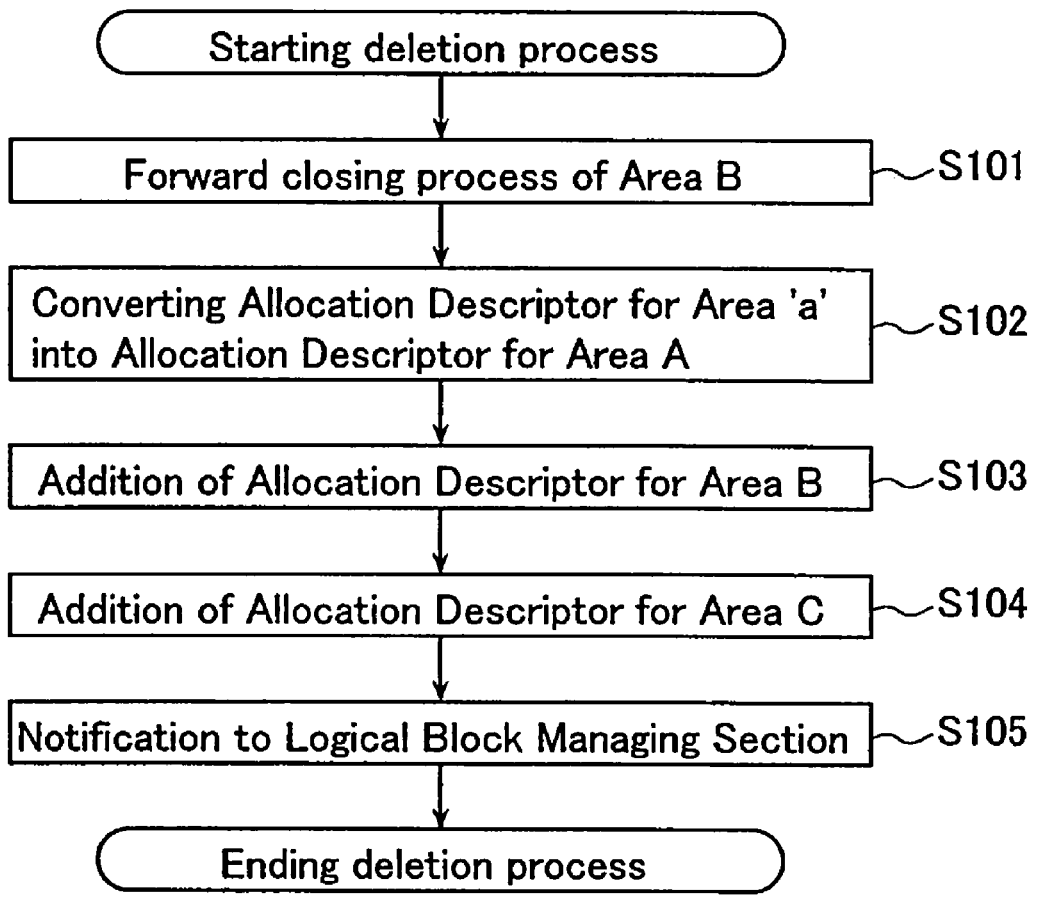
FIG. 10 is a flow chart showing processing at a deletion proceeding section of an AV data recording apparatus in Embodiment 2 of the present invention.

The following is an explanation of a process flow at a deletion processing section 64. FIG. 10 is a flow chart showing a process at a deletion processing section of an AV data recording apparatus in Embodiment 2 of the present invention. FIG. 10 relates to a case where a user watches a reproduced video to instruct deletion of a specific part in order to delete a corresponding VOBU#51 in FIG. 4. Among the data in VOBU#52, only the data written in the logical block #5502 are closed forward and rewritten so that they start from the head of the logical block #5502 (step S101). This forward-closed part is regarded as an area B.

Next, the file entry is modified as shown in FIGS. 7 and 9 (steps S102 to S104). The allocation descriptor A in FIG. 7 indicates that the recorded content starts from the logical block #5000 (sector #80000), the effective data size (recorded length) is 16383072 bytes, and that the data size of 2048 byte units including the effective data (extent length) is 16384000 bytes. The allocation descriptor B indicates that the content starts from the logical block #5502 (sector #88032), the effective data size (recorded length) is 16544 bytes and that the data size of 2048 byte units including the effective data (extent length) is also 16432 bytes. The allocation descriptor C indicates that the content starts from the logical block #5503 (sector #88048), and that the effective data size (recorded length) and the extent length are 16299600 bytes. Finally, the logical block managing section is notified that the logical block #5501 becomes free (step S105). In this way, a deletion process is completed.

As mentioned above, only one logical block will be closed forward in Embodiment 2, and deletion is completed by adding and modifying the allocation descriptors. Since the entire area C is not necessarily closed forward, the process time and effort at the deletion processing section 64 is decreased considerably. Moreover, realtime recording/realtime reproduction of a video via a 1394 interface before a deletion process, and reproduction and partial deletion of a file at the time of connecting to a PC can be performed easily and efficiently in any of Embodiment 1 and 2, since VOBUs are allocated continuously in Embodiment 1, or a part of VOBUs is allocated intermittently to the logical blocks in Embodiment 2.

During a reproduction after the deletion, for example, in skipping from the area A to the area B, a separate MPEG buffer control should be executed before the skipping in order to ensure a continuous reproduction while an area that a user can designate for deletion is a VOBU unit in Embodiment 2, this is not limited thereto but the VOBU unit can be replaced with, e.g., a frame unit. In such a case, however, a VOBU will be deleted only when it is included entirely in an area that a user designates for deletion. When a VOBU partially includes a deletion area, an additional process will be required, such as deleting unnecessary frames by editing to shorten the VOBU, or controlling for preventing reproduction of frames included in the deletion area without deleting the corresponding VOBU.

Alternatively an area that a user can designate for deletion may be a field unit. In such a case, however, a VOBU will be deleted only when it is included entirely in an area that a user designates for deletion. When a VOBU partially includes a deletion area, an additional process will be required, such as deleting unnecessary frames by editing to shorten the VOBU and to prevent reproduction of a specific frame, or controlling for preventing reproduction of a field included in the deletion area, without deleting the corresponding VOBU.

Though a VOBU is composed of transport packets in Embodiment 2, it can be composed of packs of a program stream of an arbitrary length.

Though a VOBU is composed of transport packets in Embodiment 2, it can be a PES stream composed of PES packets having an arbitrary packet length. Moreover, it can be a stream of unique format composed of packets of a specific format.

Embodiment 3

Figure 11:
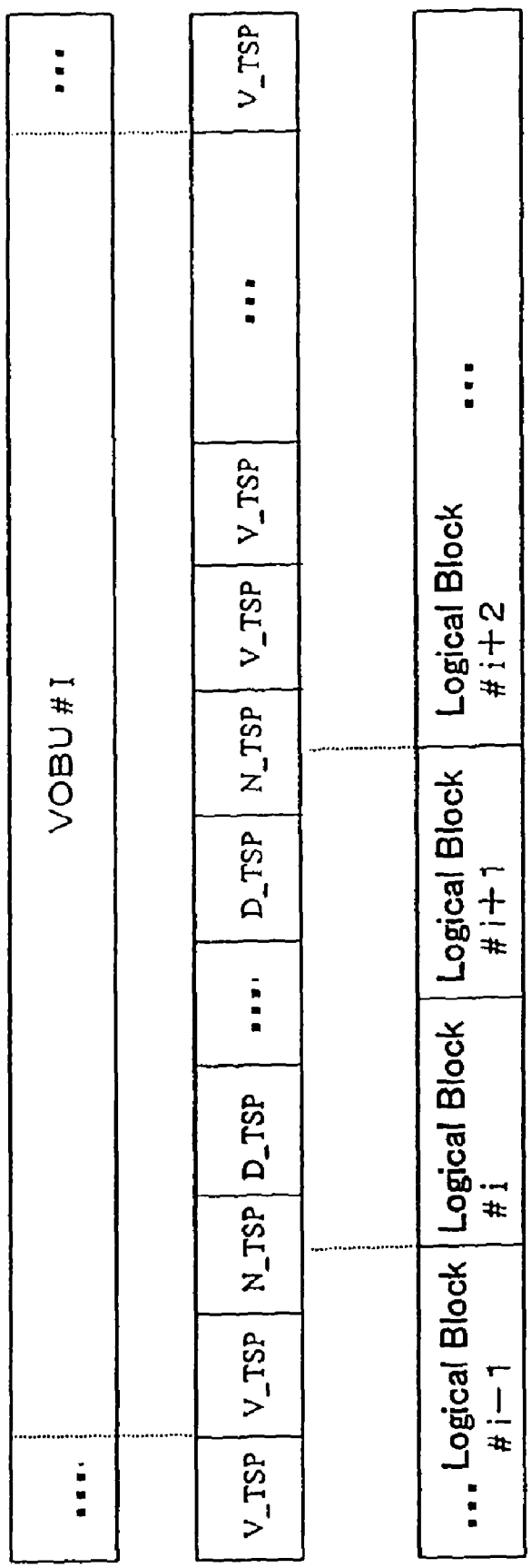
FIG. 11 is a diagram showing a recording form of an AV data recording apparatus in Embodiment 3 of the present invention.

The following is an explanation of a case where a user records video data, and the data can be post-recorded afterward. FIG. 11 is a diagram showing a recording form in an AV data recording apparatus in Embodiment 3 of the present invention. In FIG. 11, a VOBU is composed of V_TSPs and A_TSPs similar to Embodiment 1, and also composed of dummy packets (hereinafter, each dummy packet is referred to as "D_TSP") for storing a secondary audio at the time of post-recording and null transport packets (hereinafter, each null transport packet is referred to as "N_TSP"). A D_TSP is identified with PID="0x0022" and a N_TSP is identified with PID="0x1FFF". An audio signal is designated previously for stream types (stream, type fields of transport packet headers) of data stored in the D_TSP at the time of recording a video.

When a peak rate of the second audio to be post-recorded is a little less than 512 kbps per 2ch (including a transport header), a data size for one minute is less than two logical blocks.

When video data are recorded to be post-recorded, e.g., in a VOBU#1 as shown in FIG. 11, a N_TSP is allocated in a border between a logical block #(i−1) and a logical block #i, while N_TSP is allocated in a border between a logical block #(i+1) and a logical block #(i+2), and an interval therebetween is padded with D_TSPs substantially corresponding to 512 Kbps. Similarly, a D_TSP sandwiched with N_TSPs is placed in each VOBU. The writing position of D_TSP is determined to follow a first logical block within the VOBU. In this way, the D_TSP position can be specified without reading a logical block including D_TSP.

When a secondary audio signal is post-recorded, A TSPs as audio transport packets for the secondary audio are recorded in physical positions of D_TSP while displaying in each VOBU a recorded video with no accompanying audio. At this time, the writing position for recording the secondary audio is closed in a logical block, and no extra processes but writing audio data will be required. That is, as there is no possibility of RMW occurrence, a high speed process is available when compared to conventional technologies.

For reproducing a video synchronizing with the secondary audio, V_TSP and A_TSP with PID="0x0022" may be reproduced.

As mentioned above, in Embodiment 3, process amounts in recording secondary audio at the time of post-recording can be decreased considerably, and a post-recording function can be performed easily.

Though a transport stream is used to record in Embodiment 3, it can be replaced with a program stream composed of packs. In such a case, dummy packs with a total size equal to a logical block will be recorded to the logical block.

In the Embodiment 3, the D_TSP position is determined to follow a first logical block whose head is included in a VOBU, but the position can be in the second or the latter VOBUs. Alternatively, a position to start D_TSP can be determined arbitrarily. Though the stream type of D_TSP is audio in this embodiment, it also can be private data.

Though a D_TSP in Embodiment 3 is determined so that PID="0x0022" in recording a video for subsequent post-recording, the value can be in a range between "0x0002" to "0x1FFF". However, when the PID is "0x1FFF", the PID should be allocated with a value in a range from "0x0002" to "0x1FFE" at the time of post-recording.

Though recording is executed with a transport stream in Embodiment 3, the transport stream can be replaced with a PES stream composed of PES packets having an arbitrary packet length. When such a PES stream is used, dummy PES packets having a total size of at least a logical block size is recorded to be dummy packets. A PES packet of a secondary audio and a dummy PES packet can be identified by changing a stream ID of the PES.

Embodiment 4

Figure 12:
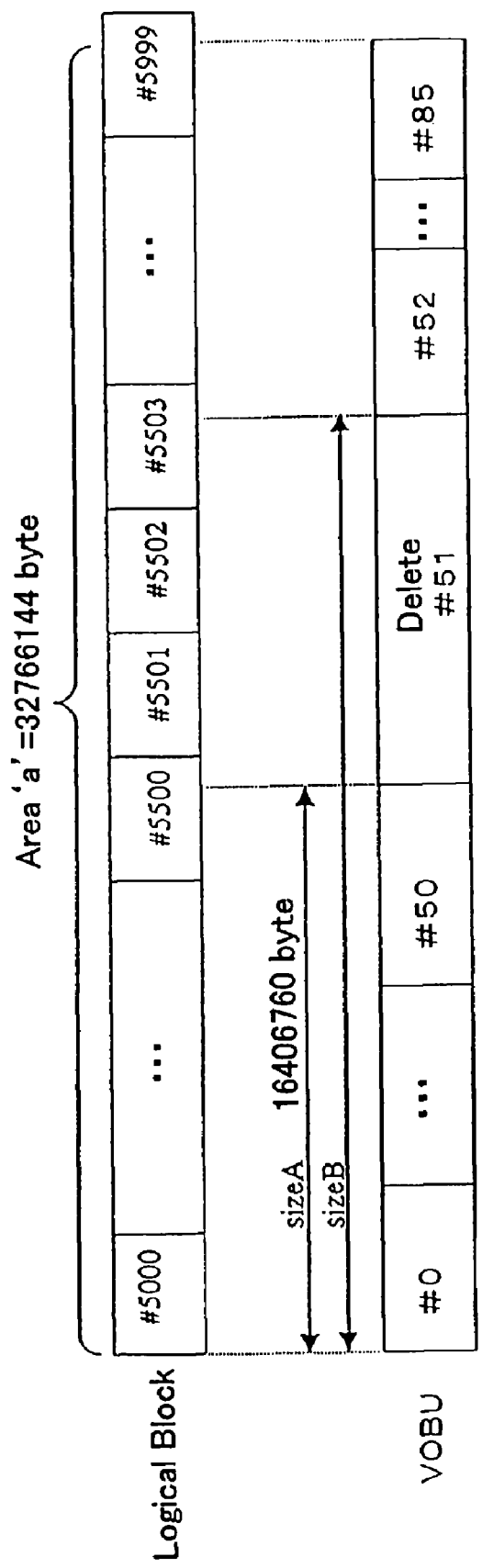
FIG. 12 is a diagram showing a recorded content in an AV data recording apparatus before a deletion operation in Embodiment 4 of the present invention.

The following is an explanation of a case where a user deletes a specific VOBU of a recorded video. FIG. 12 is a diagram showing a content recorded in an AV data recording apparatus in Embodiment 4 before a deletion operation. In FIG. 12, VOBU#0-VOBU#85 are recorded ranging from logical blocks #5000 to 5999. In this embodiment, an area of the entire recorded VOBUs is regarded as an area 'a', and the data size is determined to be 32766144 bytes. A user will designate VOBU#51 as a part to be deleted while reproducing the recorded video. The VOBU#51 to be deleted is recorded in a range of #5500, #5501, #5502 and #5503.

FIGS. 13-16 are diagrams showing contents recorded after a deletion operation in an AV data recording apparatus in Embodiment 4 of the present invention. In FIGS. 13-16, N_TSP denotes a null transport packet.

Figure 13:
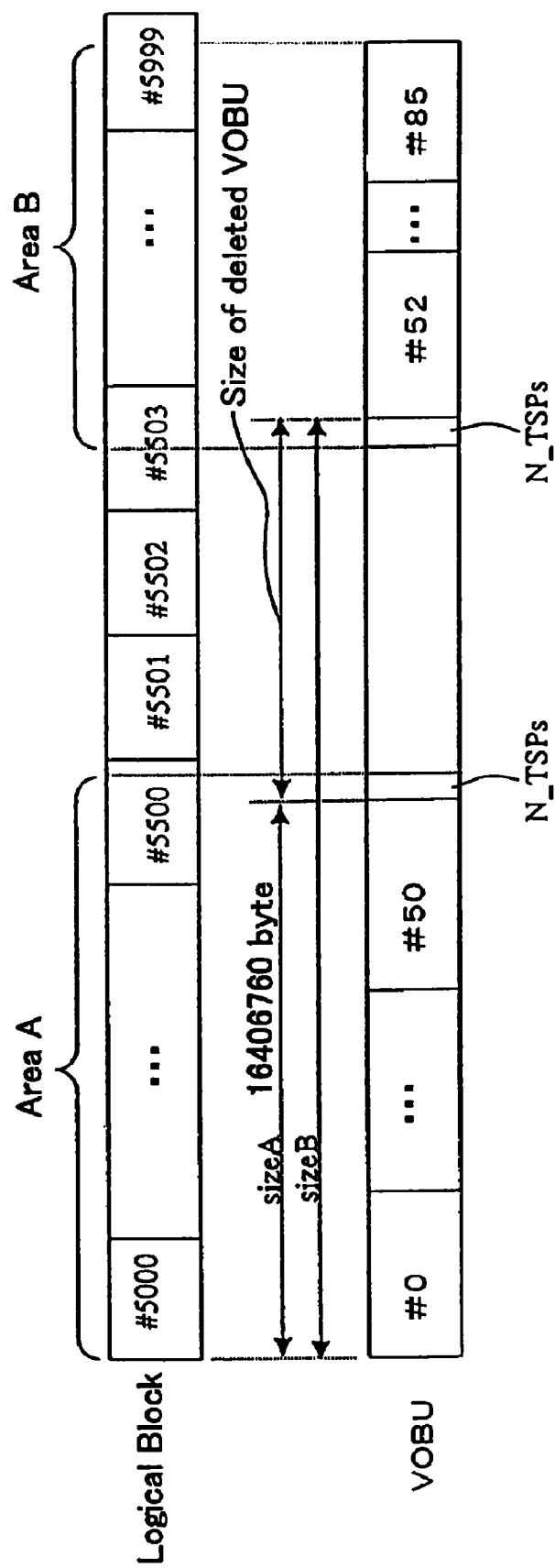
FIG. 13 is a diagram showing a recorded content in an AV data recording apparatus after a deletion operation in Embodiment 4 of the present invention.

In FIG. 13, VOBUs are recorded in logical blocks #5000-#5500, and #5503-#5999, while logical blocks #5501 and #5502 are free areas (unused). In other words, any of VOBU#0-VOBU#50, and VOBU#52-#85 is recorded in each of the logical blocks, while VOBU#51 is deleted from the recorded content. A data size ranging from the head of the VOBU#0 to the end of the VOBU#50 is determined as size A, while a data size ranging from the head of the VOBU#0 to the end of the VOBU#51 before a deletion is determined as size B. Further, null transport packets (N_TSPs) are allocated at positions after the VOBU#50 and before the VOBU#52. At this time, area A corresponds to a data area preceding the deletion area, having N_TSPs added to the back thereof. Area B corresponds to a data area behind the deletion area, having N_TSPs at the front thereof. A data size ranging from the head of the VOBU#0 to the end of the VOBU#50 is determined to be 16406760 bytes.

Figure 14:
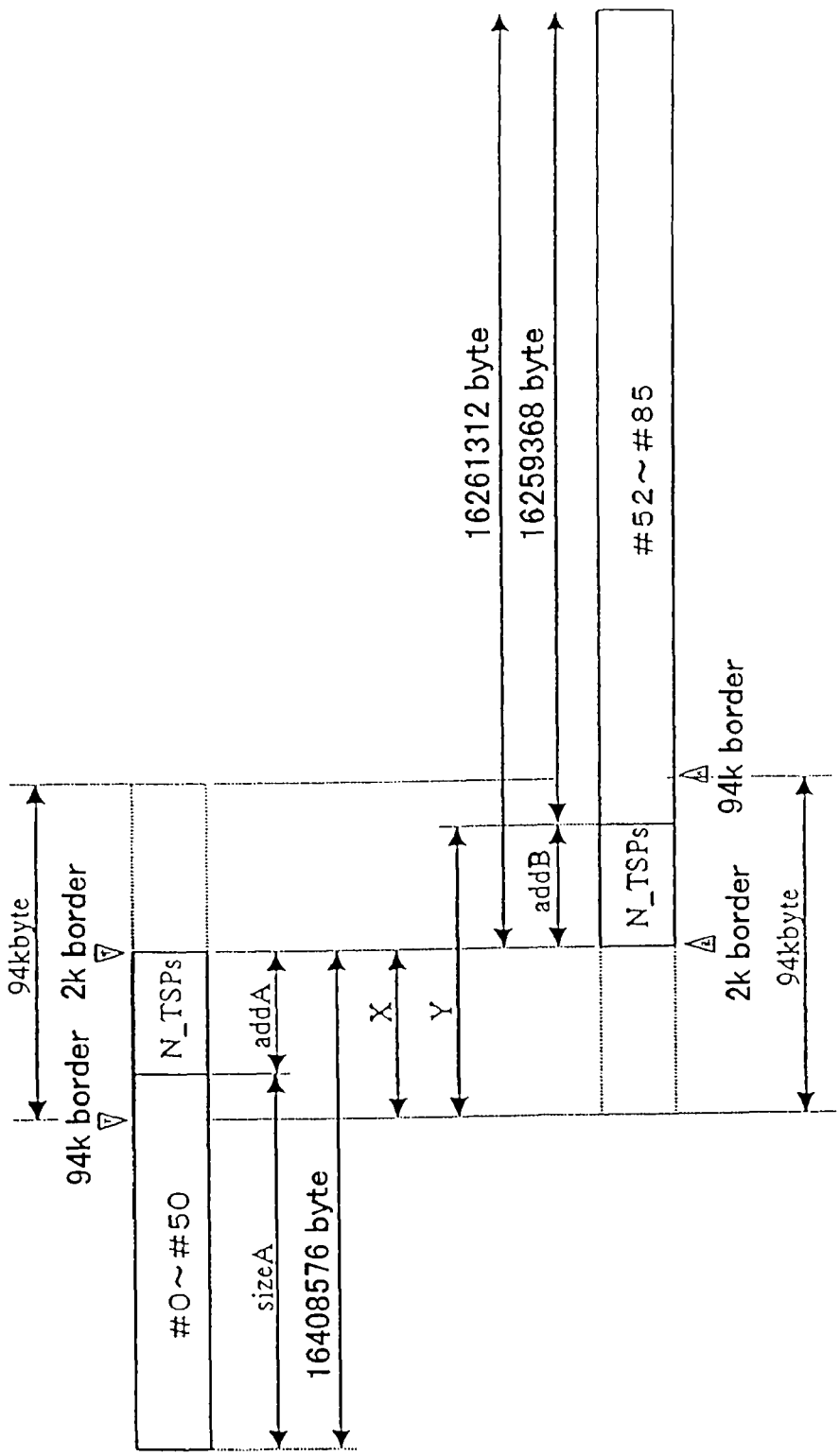
FIG. 14 is a diagram showing a recorded content in an AV data recording apparatus after a deletion operation in Embodiment 4 of the present invention.
Figure 15:
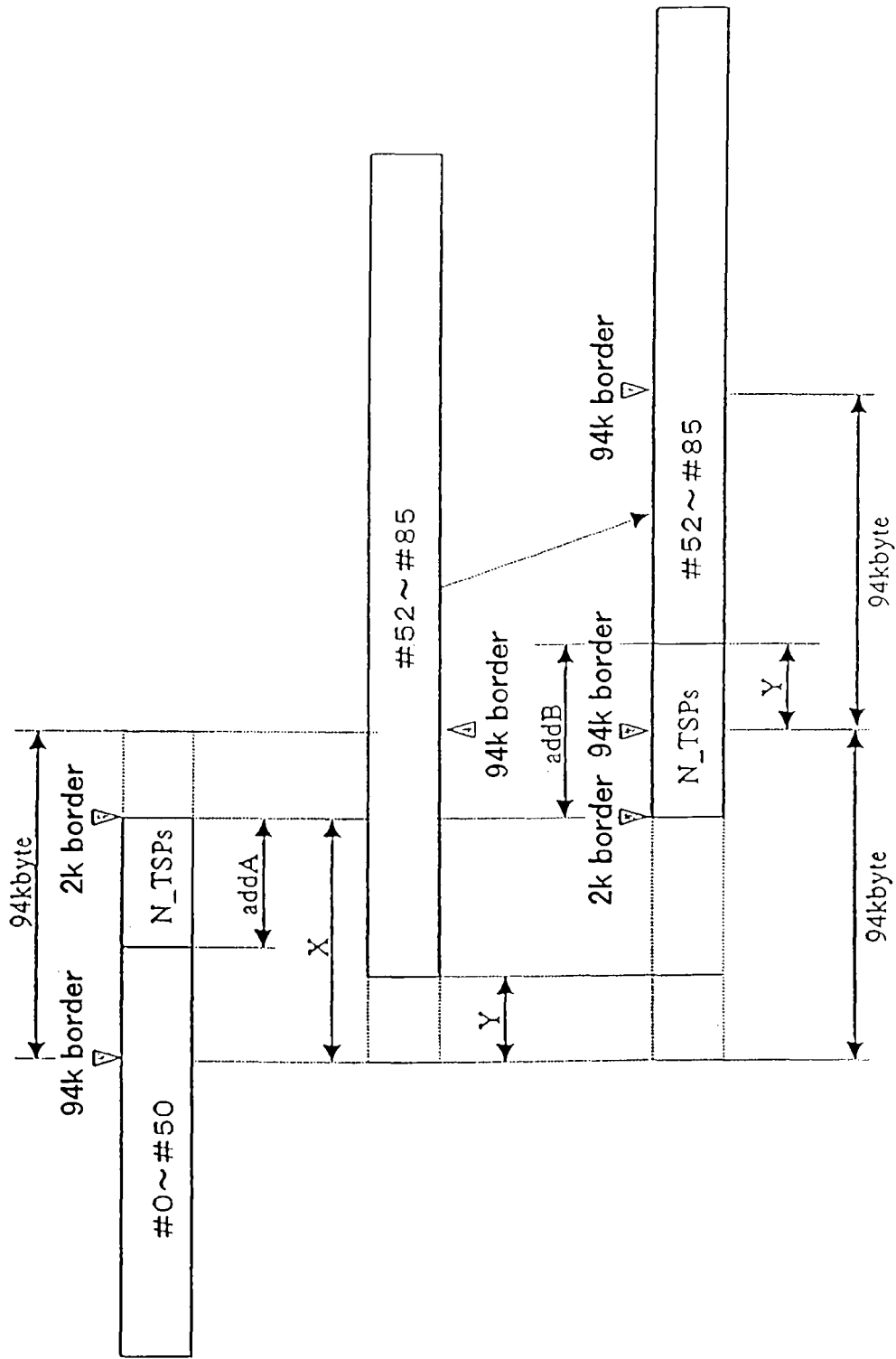
FIG. 15 is a diagram showing a recorded content in an AV data recording apparatus after a deletion operation in Embodiment 4 of the present invention.

FIG. 14 shows an example of deletion where the deleted VOBU#51 has a size of 100016 bytes, while FIG. 15 shows an example of deletion where the deleted VOBU#51 has a size of 80088 bytes. In FIGS. 14 and 15, "add A" and "add B" indicate respectively the data sizes of N_TSPs added behind the VOBU#50 and N_TSPs added in front of the VOBU#52.

X and Y are numerical values relating to borders of 94 kbytes (94×1024 bytes) counted from the head of the data before deletion. X indicates a data size ranging from the final 94 kbyte border of a data part in front of the deleted area to the end of the part of the added null transport packet. Y indicates a data size ranging from another 94 kbyte border that is placed immediately before the first 94 kbyte border in a data part behind the deletion area to the head of the area B.

FIG. 14 shows a case of Y≧X, and FIG. 15 shows a case of Y<X. The size of 94 kbytes (94×1024 bytes) is equal to the lowest common multiple between 188 bytes of the transport packet size and 2048 bytes of the sector size.

Figure 16:
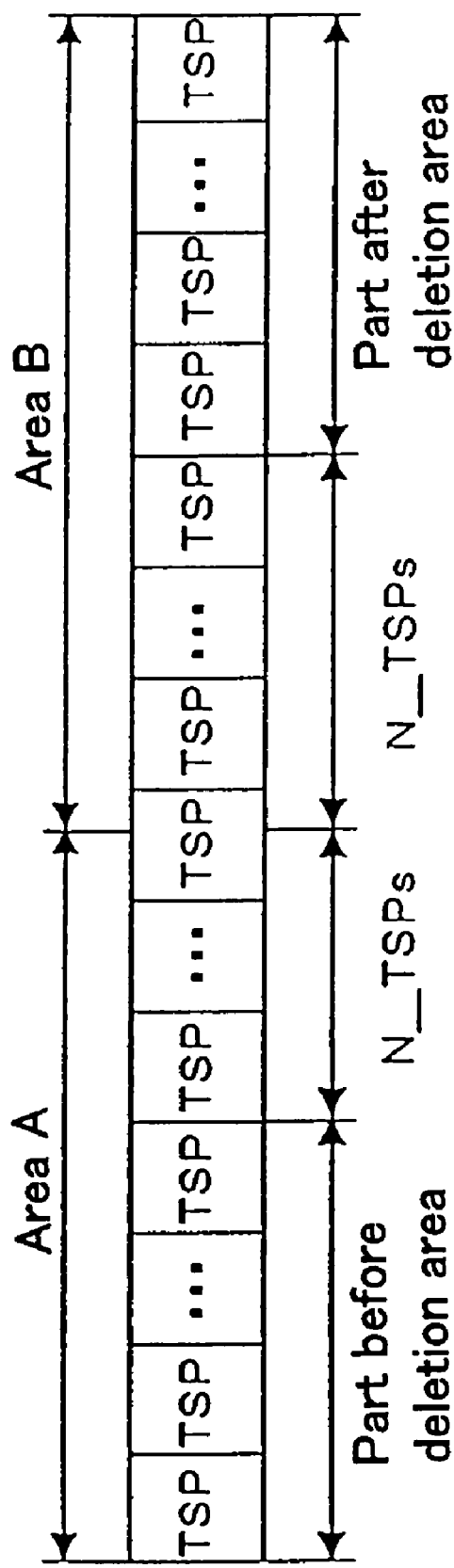
FIG. 16 is a diagram showing a recorded content in an AV data recording apparatus after a deletion operation in Embodiment 4 of the present invention.

FIG. 16 shows the continuous state of the transport packets in the areas A and B.

FIG. 16 shows a structure of a file recorded before a deletion operation in an AV data recording apparatus according to Embodiment 4 of the present invention. FIG. 16 indicates that the content recorded in the area 'a' in FIG. 12 (logical blocks #5000-#5999) is linked to a file entry by an allocation descriptor.

Figure 17:
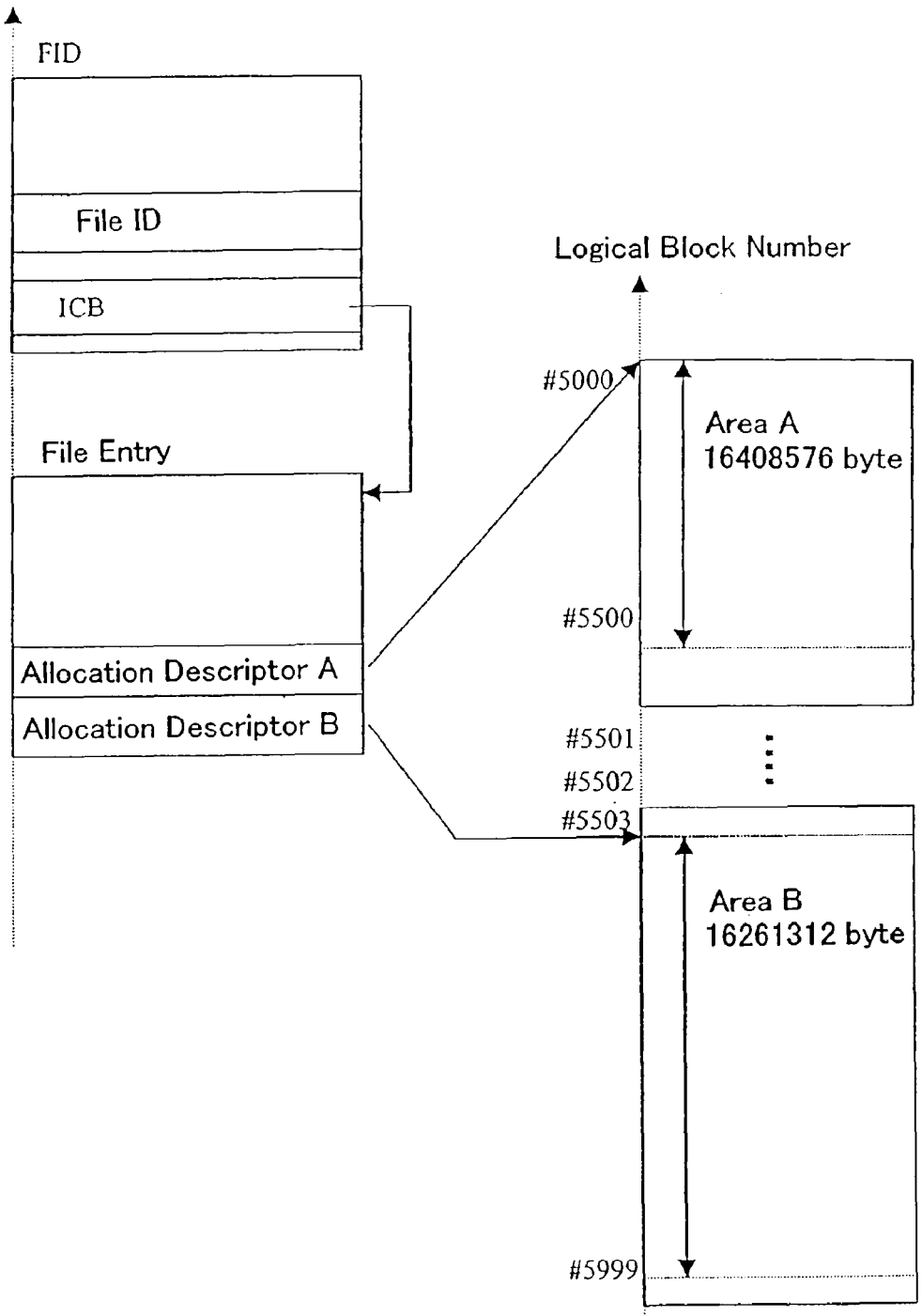
FIG. 17 is a diagram showing a structure of a recorded content file after a deletion operation in an AV data recording apparatus in Embodiment 4 of the present invention.

FIG. 17 is a diagram showing a structure of a file recorded after a deletion operation in an AV data recording apparatus according to Embodiment 4 of the present invention. FIG. 17 shows that the contents recorded in the areas A and B of FIGS. 14 and 15 are linked to a file entry by two allocation descriptors.

FIG. 18 is a diagram showing numerical values concerning an allocation descriptor of a file entry before a deletion operation for an AV data recording apparatus in Embodiment 4 of the present invention. Here, a short allocation pointer shown in FIG. 30A is used as an allocation descriptor. The extent location shows a head sector number of the area 'a' in FIG. 12, and also indicates a sector number "80000" corresponding to a logical block #5000. An extent length indicating an effective data length shows 32766144 bytes. Since one allocation descriptor corresponds to 8 bytes, the allocation descriptor length is '8'.

FIG. 19 is a diagram showing numerical values relating to an allocation descriptor of a file entry after a deletion operation in an AV data recording apparatus in Embodiment 4 of the present invention. Similarly, the allocation descriptors used here are the ones shown in FIG. 30A. The respective extent locations of the allocation descriptors A and B indicate the head sector numbers of the areas A and B in FIG. 14, and also indicate the sector numbers "80000" and "88059" corresponding to the head sector (first sector) within the logical block #5000, and the twelfth sector within the logical block #5503. The extent lengths of the allocation descriptors A and B indicate the effective data lengths of 16406760 bytes and 16261312 bytes respectively. Since two allocation descriptors are used, the allocation descriptor length is '16'.

'add A' of the area A and 'add B' of the area B will be calculated in accordance with the following Equations 1 and 2. Equation 1 is used to derive the 'add A' of the area A.

$$\text{if } \left[\frac{\text{size } A}{2048}\right]_{modular} \neq 0 \quad \text{Equation 1}$$

$$\text{then}$$

$$\text{add } A = \left(\left[\frac{\text{size } A}{2048}\right]_{round} + 1\right) \times 2048 - \text{size } A$$

$$\text{else}$$

$$\text{add } A = 0$$

Equation 2 is used to derive the 'add B' of the area B.

$$X = (\text{size } A + \text{add } A) - \left[\frac{\text{size } A \div \text{add } A}{94 \times 1024}\right]_{round} \times (94 \times 1024) \quad \text{Equation 2}$$

$$Y = \text{size } B - \left[\frac{\text{size } B}{94 \times 1024}\right]_{round} \times (94 \times 1024)$$

$$\text{if } (Y \geq X)$$

$$\text{if } \left[\frac{\text{size } B}{94 \times 1024}\right]_{modular} \neq 0$$

$$\text{then}$$

$$\text{add } B = Y - X$$

$$\text{else}$$

$$\text{add } B = 0$$

$$\text{else}$$

$$\text{add } B = (94 \times 1024 - X) \div Y$$

The Derivative Equation of 'add B' in Y≧X differs from that in Y<X. In Equations 1 and 2, 'modular' means a remainder in the division, and 'round' means a value obtained by omitting the numerical values after the decimal fractions from the divisional result.

Figure 20:
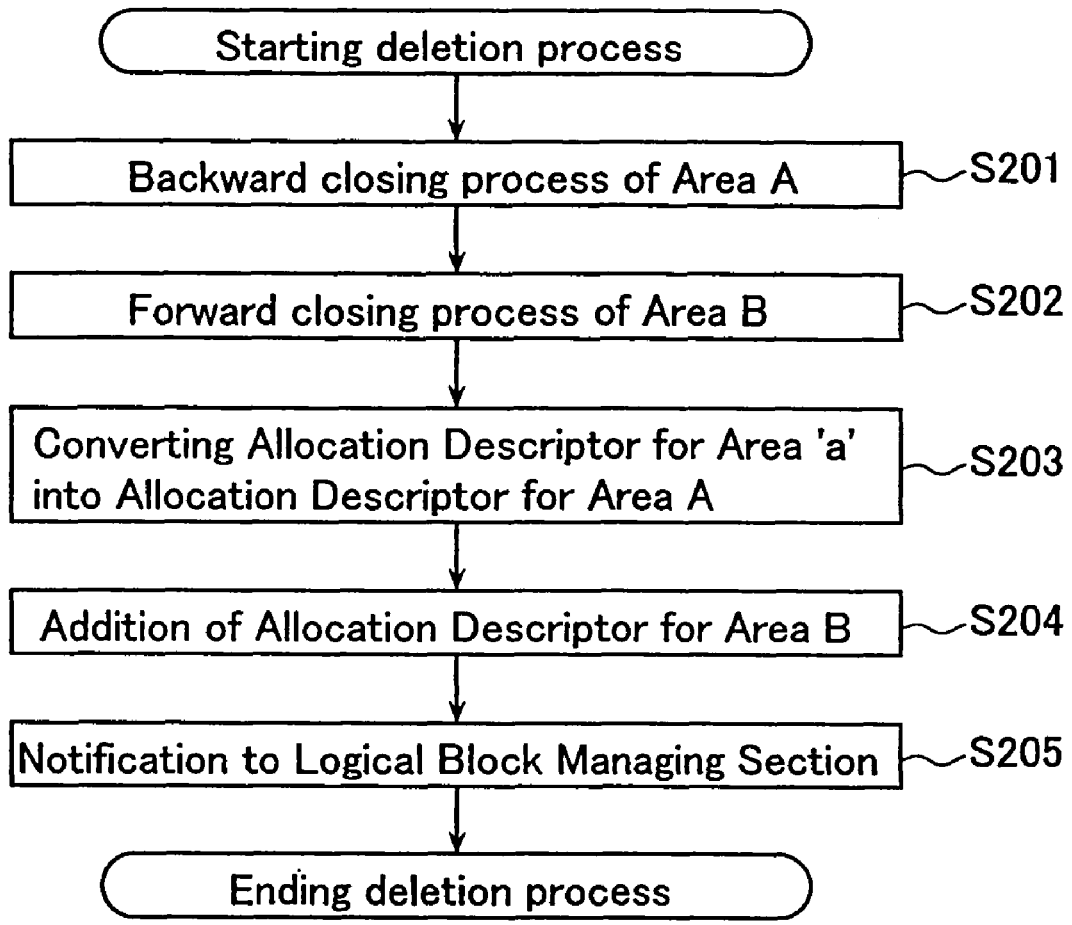
FIG. 20 is a flow chart showing processing at a deletion proceeding section of an AV data recording apparatus in Embodiment 4 of the present invention.

The process flow at the deletion processing section 64 is described as follows. FIG. 20 is a flow chart showing a process at a deletion processing section of an AV data recording apparatus in Embodiment 4 of the present invention. FIG. 20 refers to an explanation of a case where a user watches a reproduced video to instruct deletion of a specific part and to delete VOBU#51 in FIG. 12, which corresponds to the part to be deleted. First, an area A is configured by adding only null transport packets for the size 'add A' after the VOBU#50 (step S201). Therefore, the data size of the area A will be equated to an integral multiple of 2048 bytes. Next, an area B is configured by adding only null transport packets for the size of 'add B' in front of the VOBU#52 (step S202). Here, the null transport packets of the area A and of the area B are arranged successively.

As a result, a data starting address of the area B will be an integral multiple of 2048 bytes when the number is counted from the head of the VOBU#0 excepting the VOBU#51. As mentioned above, since the end of the area A and the head of the area B will be 2048 byte borders, the conditions for the short allocation pointer of UDF will be met. Moreover, when the area A and the area B are connected, 188 byte-transport packets will be allocated in a sequence. This is shown in FIG. 16.

As shown in FIG. 14, when a data size of the VOBU#51 is, e.g., 100016 bytes, X=45056, Y=47000 and Y≧X, and thus, null transport packets of add A=1816 bytes and add B=1944 bytes will be added.

When the data size of the VOBU#51 is e.g., 80088 bytes as shown in FIG. 15, X=45056, Y=27071 and Y<X, and thus, null transport packets of add A=1816 bytes and add B=78272 bytes will be added.

Next, the file entry is modified as shown in FIGS. 17 and 19 (steps S203-S204). The numerical values in FIG. 19 are related to the case of FIG. 14. The allocation descriptor A in FIG. 17 indicates that the recorded content starts at the head sector (sector #80000) of the logical block #5000, and that the data size is 16408576 bytes. It indicates also that the allocation descriptor B starts at the twelfth sector (sector #88059) of the logical block #5503, and that the data size is 16261312 bytes. Finally, the logical block managing section is notified that logical blocks #5501 and #5502 become free (step S205). Accordingly, a deletion processing is completed.

Accordingly in Embodiment 4 of the present invention, a deletion process is completed by adding null transport packets and also by adding-modifying an allocation descriptor. Since this process does not require forward closing of the entire areas after the deletion area, the time and effort for a process at the deletion processing section 64 is reduced considerably. Moreover, realtime recording/realtime reproduction of a video through a 1394 interface before a deletion operation, file reproduction and partial deletion operation at the time of connecting to a PC can be performed in an easy and efficient manner by either allocating VOBUs continuously as in Embodiment 1 or by allocating VOBUs continuously with null packets therebetween.

During reproduction after a deletion operation, for example, when skipping is executed from the area A to the area B, a separate buffer control of MPEG may be required before the skip in order to ensure a continuous reproduction.

In this embodiment, an area that a user can designate for deletion is composed of VOBU units. This is not limited thereto, but it can be, for example, frame units. In that case, however, only VOBUs that are included completely in a deletion area designated by the user will be deleted. When a VOBU partially includes a deletion area, a certain process should be executed. For example, editing will be executed to delete an unnecessary frame to shorten the VOBU, or control will be conducted to avoid reproduction of a frame included in the deletion area without deleting the VOBU.

A deletion area that can be designated by a user can be a field unit. In such a case, however, only VOBUs included completely in a deletion area designated by a user will be deleted. When a VOBU partially includes a deletion area, a certain process is required. For example, an unnecessary frame is deleted by editing to shorten VOBU and to prevent a specific VOBU from being reproduced; or a field in a deletion area is controlled not to be reproduced without deleting the VOBU.

Though each of the VOBU in Embodiment 4 is composed of transport packets, it can be composed of packs of a program stream of 2 kbyte units. In such a case, however, addition of null packs as shown in FIG. 20 will not be needed.

Though each of the VOBU is composed of a transport stream in Embodiment 4, it can be also a PES stream being composed of PES packets having an arbitrary packet length or program stream packs. Alternatively, it can be a stream of a unique format composed of packets of unique format. In such a case, dummy packets should be used, and the dummy packets are either packets having an unused stream ID or a private stream ID.

Though the end position of the area A corresponds to the border of 2 kbytes, it also can correspond to a border of a logical block size (32 kbytes).

Embodiment 5

The following explanation is based on another case where a user deletes a specific VOBU of a recorded video.

Figure 21A:
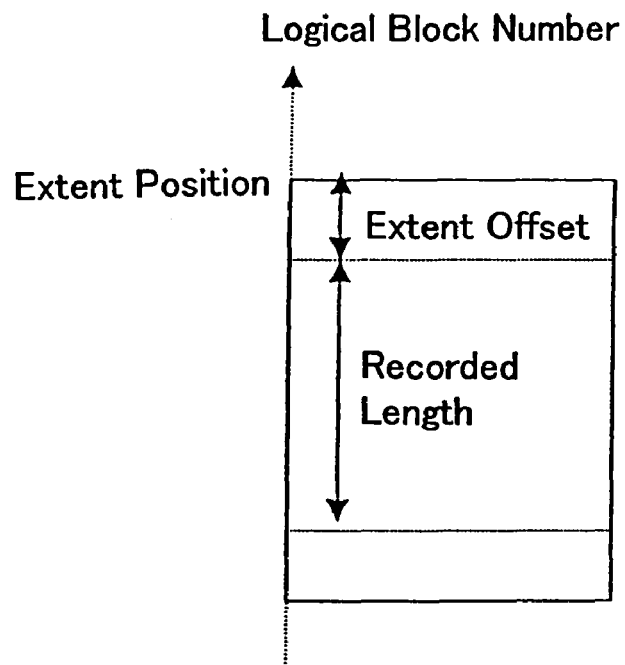
FIGS. 21A and 21B are diagrams showing data structures of allocation descriptors of AV data recording apparatuses in Embodiment 5 of the present invention.
Figure 21B:
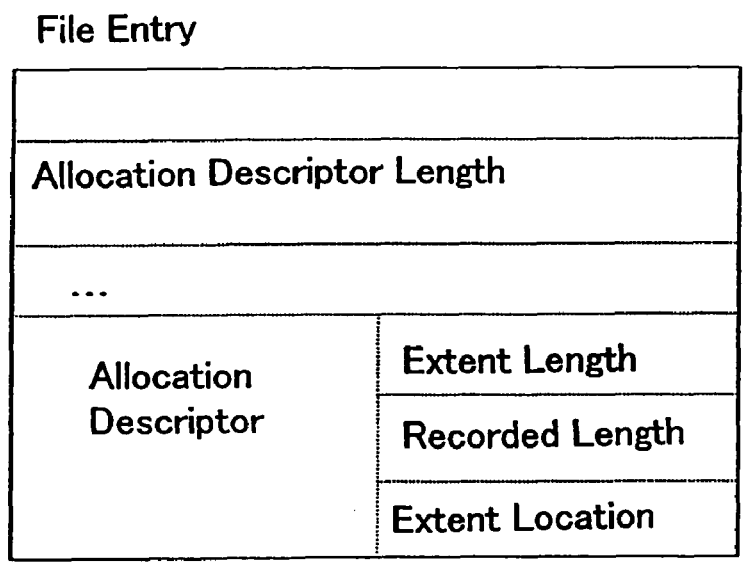

FIG. 21B illustrates a data structure of an allocation pointer of a file entry according to Embodiment 5. As shown in FIG. 21A, it manages an extent location to show a data starting sector number, an extent offset to show a size ranging from a starting sector head to an actual effective data starting address, and a recorded length to show an actual effective data size. In Embodiment 5, an allocation descriptor with such a data structure will be recorded on a file entry when a video is recorded.

Figure 22:
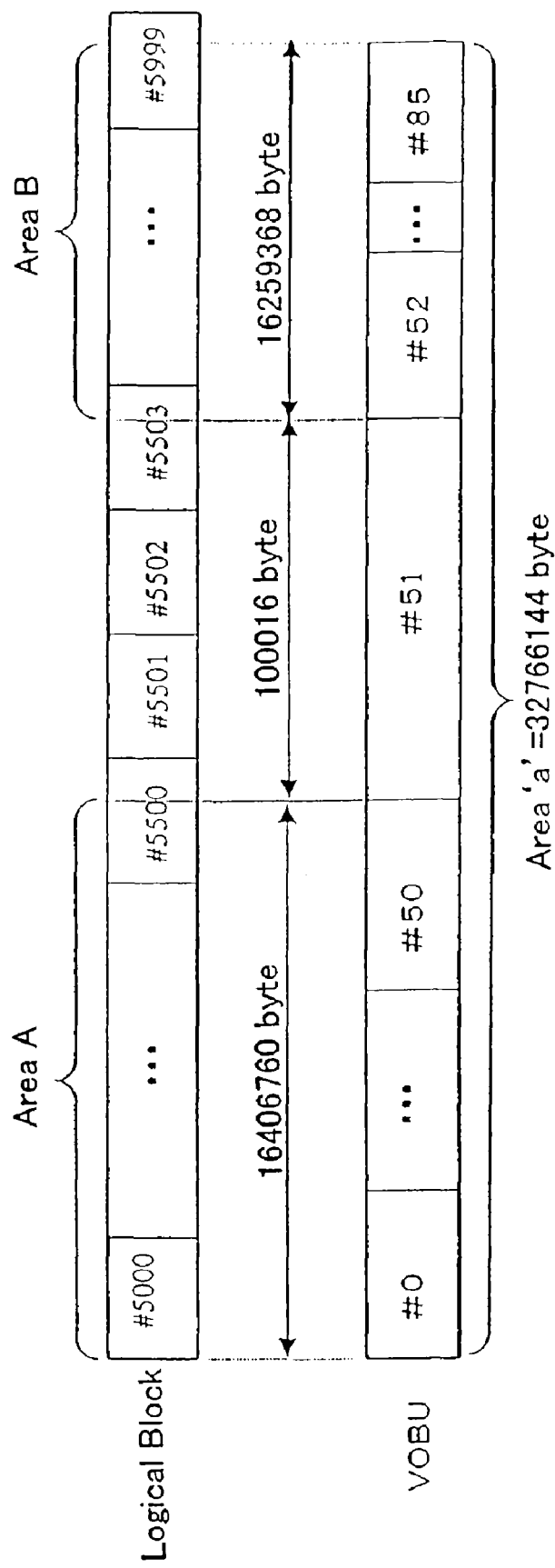
FIG. 22 is a diagram showing a recorded content in an AV data recording apparatus before a deletion operation in Embodiment 5 of the present invention.

FIG. 22 is a diagram showing a content recorded in an AV data recording apparatus in Embodiment 5 before a deletion operation. In FIG. 22, VOBU#0-VOBU#85 are recorded in a range of logical blocks #5000-5999. Here, the recorded data size is determined to be 32766144 bytes. A user will designate the VOBU#51 as a part to be deleted while he is reproducing a recorded video. The VOBU#51 to be deleted is recorded over logical blocks #5500, #5501, #5502, and #5503. The entire VOBUs are referred as area 'a'; an area ranging from the head of VOBUs to the VOBU#50 is referred to as area A, and an area ranging from the head of VOBU#52 to the end of the VOBUs is referred to as area B. It is determined that a data size ranging from the head of the VOBU#0 to the end of the VOBU#50 is 16406760 bytes, and the data size of the VOBU#51 is 100016 bytes.

Figure 23:
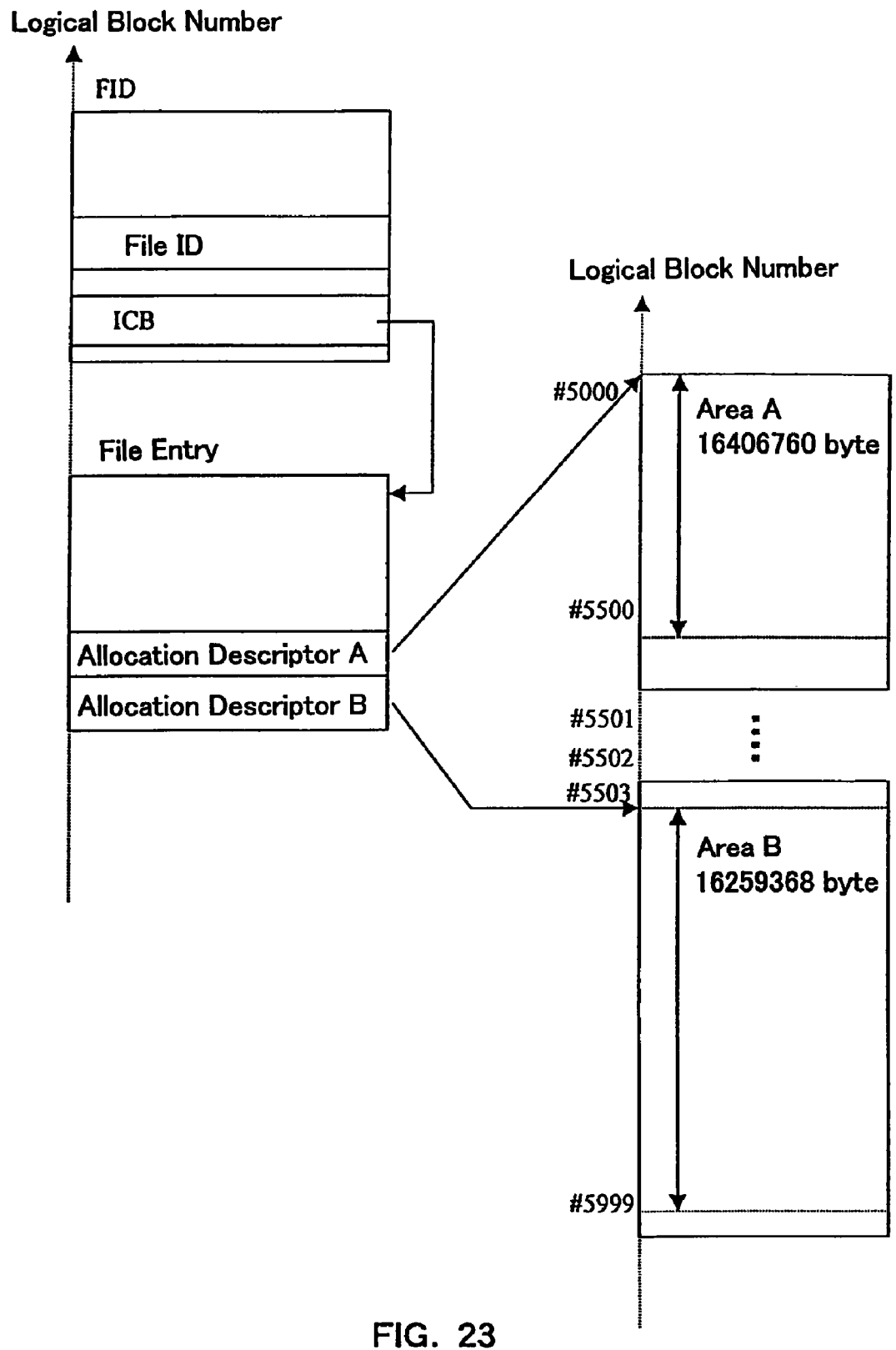
FIG. 23 is a diagram showing a structure of a recorded content file after a deletion operation in an AV data recording apparatus in Embodiment 5 of the present invention.

FIG. 23 is a diagram showing a structure of a file recorded after a deletion operation in an AV data recording apparatus according to Embodiment 5 of the present invention. FIG. 23 shows that the contents recorded in the areas A and B of FIG. 21 are linked (associated) to a file entry by two allocation descriptors.

FIG. 24 is a diagram showing numerical values concerning an allocation descriptor of a file entry before a deletion operation for an AV data recording apparatus in Embodiment 5 of the present invention. Here, an allocation pointer shown in FIG. 21 is used as an allocation descriptor. The extent location shows a head sector number of recorded data, and also indicates a sector number "80000" corresponding to a logical block #5000. It is also shown that since data are recorded from the head of a sector #80000, an extent offset is 0 byte and a recorded length showing an effective data length is 32766144 bytes. Since an allocation descriptor is 12 bytes, an allocation descriptor length is '12'.

FIG. 25 is a diagram showing numerical values relating to an allocation descriptor of a file entry after a deletion operation in an AV data recording apparatus in Embodiment 5 of the present invention. Similarly, the allocation descriptors used here are the ones shown in FIG. 21. The respective extent locations of the allocation descriptors A and B indicate the head sector numbers of the areas A and B in FIG. 23, and also indicate the sector numbers "80000" and "88059" corresponding to the head sector (first sector) within the logical block #5000, and the twelfth sector within the logical block #5503. The recorded lengths of the allocation descriptors A and B indicate the effective data lengths of 16406760 bytes and 16259368 bytes respectively.

Since the area A starts from the head of a sector, the extent offset of the allocation descriptor A is set to be '0'. Since the area B starts from the 1944 bytes of the sector #88059, the extent offset of the allocation descriptor B is set to be '1944'. Since two allocation descriptors are used, the allocation descriptor length is '24'.

Figure 26:
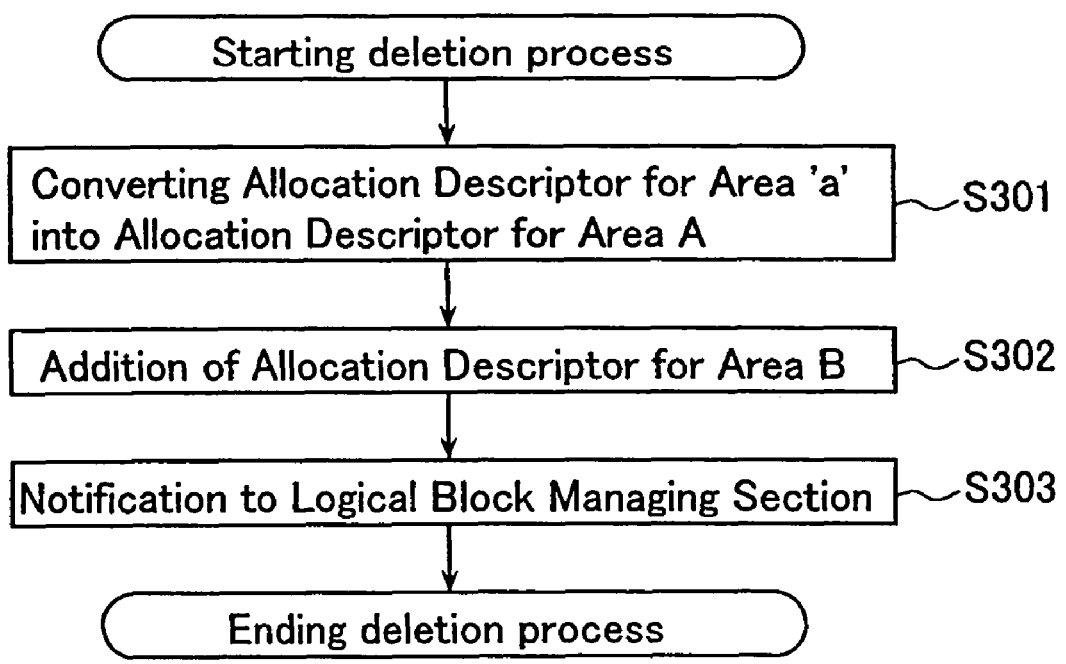
FIG. 26 is a flow chart showing a processing at a deletion proceeding section of an AV data recording apparatus in Embodiment 5 of the present invention.
Figure 27:
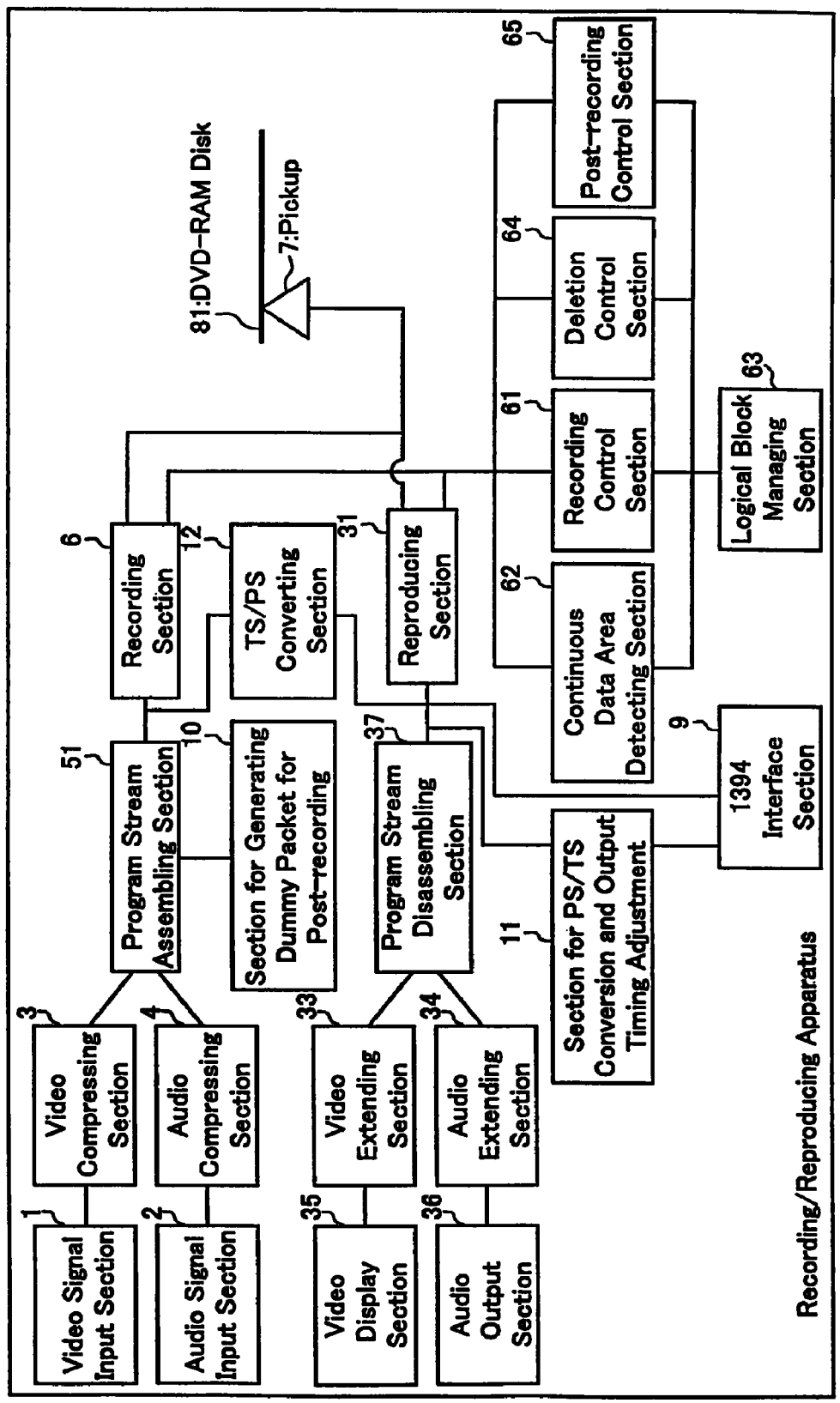
FIG. 27 is a diagram showing a structure of a conventional AV data recording/reproducing apparatus.

The process flow at the deletion processing section 64 of Embodiment 5 is described as follows. FIG. 26 is a flow chart showing a process at a deletion processing section of an AV data recording apparatus in Embodiment 5 of the present invention. FIG. 26 refers to an explanation of a case where a user watches a reproduced video to instruct deletion of a specific part and to delete VOBU#51 in FIG. 22, which corresponds to the part to be deleted. For this purpose, first, an allocation descriptor that has pointed to the area 'a' in FIG. 24 is modified to point to the area A (S301). Next, an allocation descriptor to point to the area B is added (S302). As a result, the file entry in FIG. 24 becomes the file entry shown in FIGS. 23 and 25. Regarding the allocation descriptor in Embodiment 5, there is no need to store data from the head of a sector by combining the extent offset and the recorded length. This will enable omitting of a forward closing or an addition of null packets, which are respectively described in Embodiments 2 and 4. Finally, the logical block managing section is notified that the logical blocks #5501 and #5502 become free (step S303). As a result, a deletion operation is completed.

As mentioned above, in Embodiment 5, the deletion process is completed by adding and modifying allocation descriptors. Since the entire area after the deletion area is not required to be closed forward, the time and effort at the deletion processing section 64 is decreased considerably.

During reproduction after a deletion operation, for example, when skipping is executed from the area A to the area B, a separate buffer control of MPEG may be required before the skip in order to ensure a continuous reproduction.

In Embodiment 5, an area that a user can designate for deletion is composed of VOBU units. This is not limited thereto, but it can be, for example, frame units. In that case, however, only VOBUs that are included completely in a deletion area designated by the user will be deleted. When a VOBU partially includes a deletion area, a certain process should be executed. For example, editing will be executed to delete an unnecessary frame to shorten the VOBU, or control will be conducted to avoid reproduction of a frame included in the deletion area without deleting the VOBU.

A deletion area that can be designated by a user can be a field unit. In such a case, however, only VOBUs included completely in a deletion area designated by a user will be deleted. When a VOBU includes partially a deletion area, a certain process is required. For example, an unnecessary frame is deleted by editing to shorten VOBU and to prevent a specific VOBU from being reproduced; or a field in a deletion area is controlled not to be reproduced without deleting the VOBU.

Though each of the VOBU is composed of a transport stream in Embodiment 5, it also can be a PES stream being composed of PES packets having an arbitrary packet length or program stream packs. Alternatively, it can be a stream of a unique format composed of packets of unique format.

Each transport stream in Embodiments 2, 3, 4 and 5 can be replaced with a system stream of either MPEG 1 or MPEG 4. Alternatively, it can be a Motion-JPEG compression format or a QuickTime file format.

In Embodiments 3, 4 and 5, N_TSPs are inserted between the areas A and B, or a file is partially deleted by, for example, updating an allocation pointer. Alternatively, packets defined by either the European DVB (Digital Video Broadcasting) standard or by the DIT (Discontinuity Information Table) defined by the Japanese BS digital broadcast standard can be incorporated between the areas A and B.

Here, a DIT packet is a transport packet of PID=0x001E, which indicates that a parameter (Continuity Counter or Program Clock Reference) inside a transport header and a buffer control of MPEG (e.g., a VBV buffer control of a video and a buffer control of audio) becomes discontinuous. As for the DVB standard or the BS digital broadcast standard, this packet is defined to be inserted when transmitting a transport stream.

By inserting such a DIT packet during a partial deletion of a file, data following the area B can be processed properly as a new stream that is interrupted from a stream of the area A, by using the DIT packet detection as a trigger, when a partially deleted file is realtime-reproduced through a 1394 interface or when a file is reproduced by using a MPEG reproduction software on a PC display at a time of connecting to a PC.

In Embodiments 3, 4 and 5, the files are partially deleted. Alternatively, two files are linked partially to each other so as to produce a substitute file. In such a case, a process as described in Embodiments 3, 4 and 5 may be required when linking these two parts.

Alternatively, a part of a file is extracted to produce a substitute file. In such a case, a process as described in Embodiments 3, 4 and 5 may be required for the head of the extracted part.

Furthermore, one file can be divided to produce two substitute files. In such a case, a process as described in Embodiments 3, 4 and 5 may be required when producing a second file.

In any case, a file comprising a transport stream can be produced easily by a process as described in Embodiments 3, 4 and 5.

Though MPEG transport packets are used in Embodiments 3, 4 and 5, obviously they can be replaced by data having an arbitrary data structure.

Embodiment 6

An AV data recording apparatus in Embodiment 6 of the present invention will be explained below by referring to FIGS. 36 and 37, focusing attention on differences from Embodiment 1. No specific explanations will be provided for matters identical to those of Embodiment 1.

Figure 36:
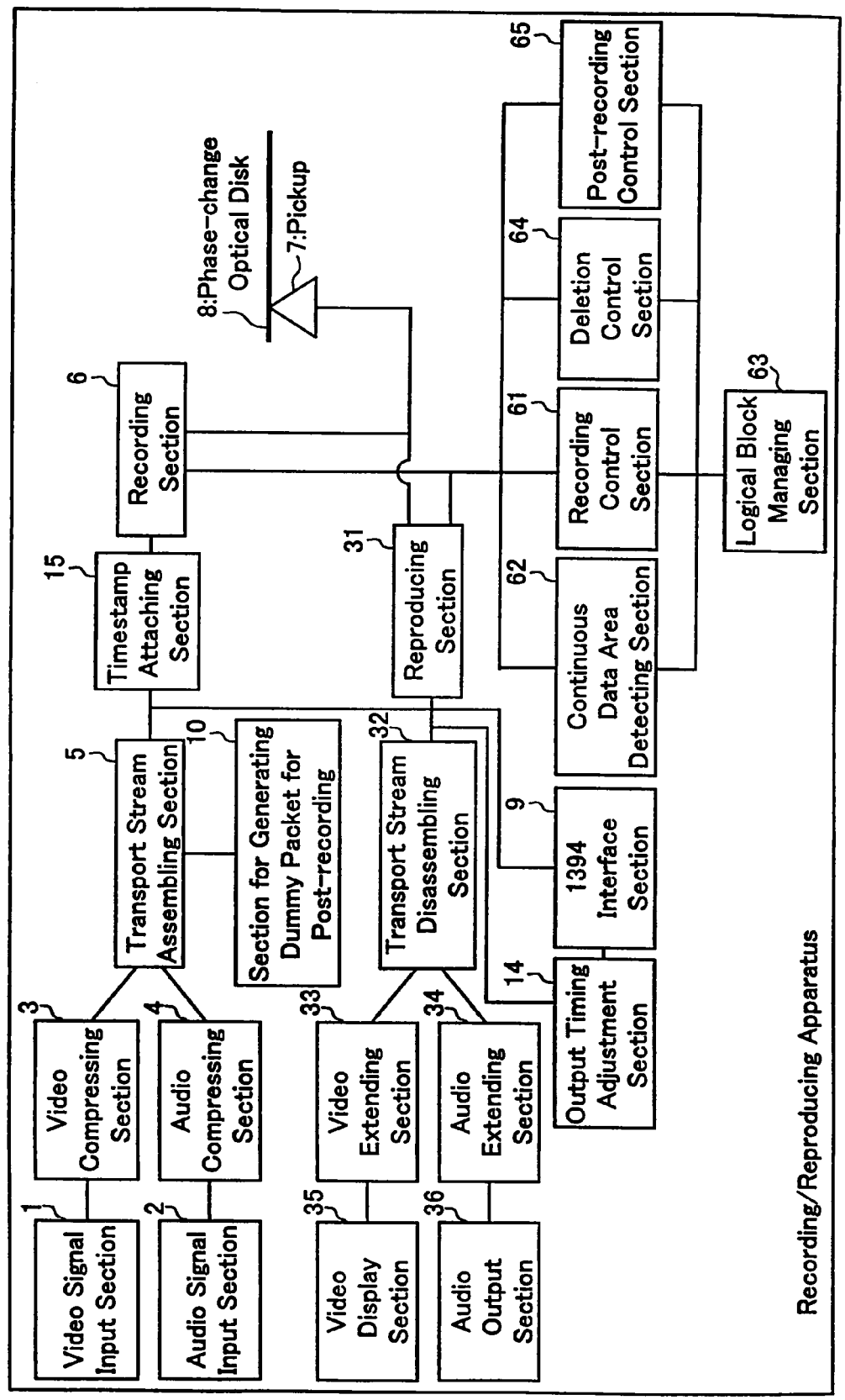
FIG. 36 is a diagram showing a structure of an AV data recording apparatus in Embodiment 6 of the present invention.

FIG. 36 is a diagram showing a block structure of an AV data recording apparatus in Embodiment 6. This block structure is distinguishable from that of an AV data recording apparatus in FIG. 3 concerning Embodiment 1 in that the output timing generating section 13 is replaced with an output timing adjustment section 14, and a timestamp attaching section 15 is added.

When a signal of the video signal input section 1 and a signal of the audio signal input section 2 are recorded, the time that a transport stream outputted from the transport stream assembling section 5 arrives at the timestamp attaching section 15 is expressed with a counter value acting with a clock of either 27 MHz or 24.576 MHz. The time is further inserted before each transport packet and recorded through the recording section 6.

When a video signal is inputted from the 1394 interface and recorded, the time of arriving from the 1394 interface section 9 to the timestamp attaching section 15 is expressed with a counter value acting with a clock of 27 MHz or 24.576 MHz. This is inserted before each transport packet and recorded through the recording section 6.

When a recorded video signal is inputted through the 1394 interface section 9, at the output timing adjustment section 14 the transport stream refers to the timestamp value added to each packet, and adjusts so that the time intervals to deliver each packet to the 1394 interface section 9 match the differences of the corresponding timestamp. The 1394 interface section 9 outputs the transport packets onto the 1394 transmission channel so that the time intervals between the delivered packets can be maintained at the packet receiving side.

Figure 37:
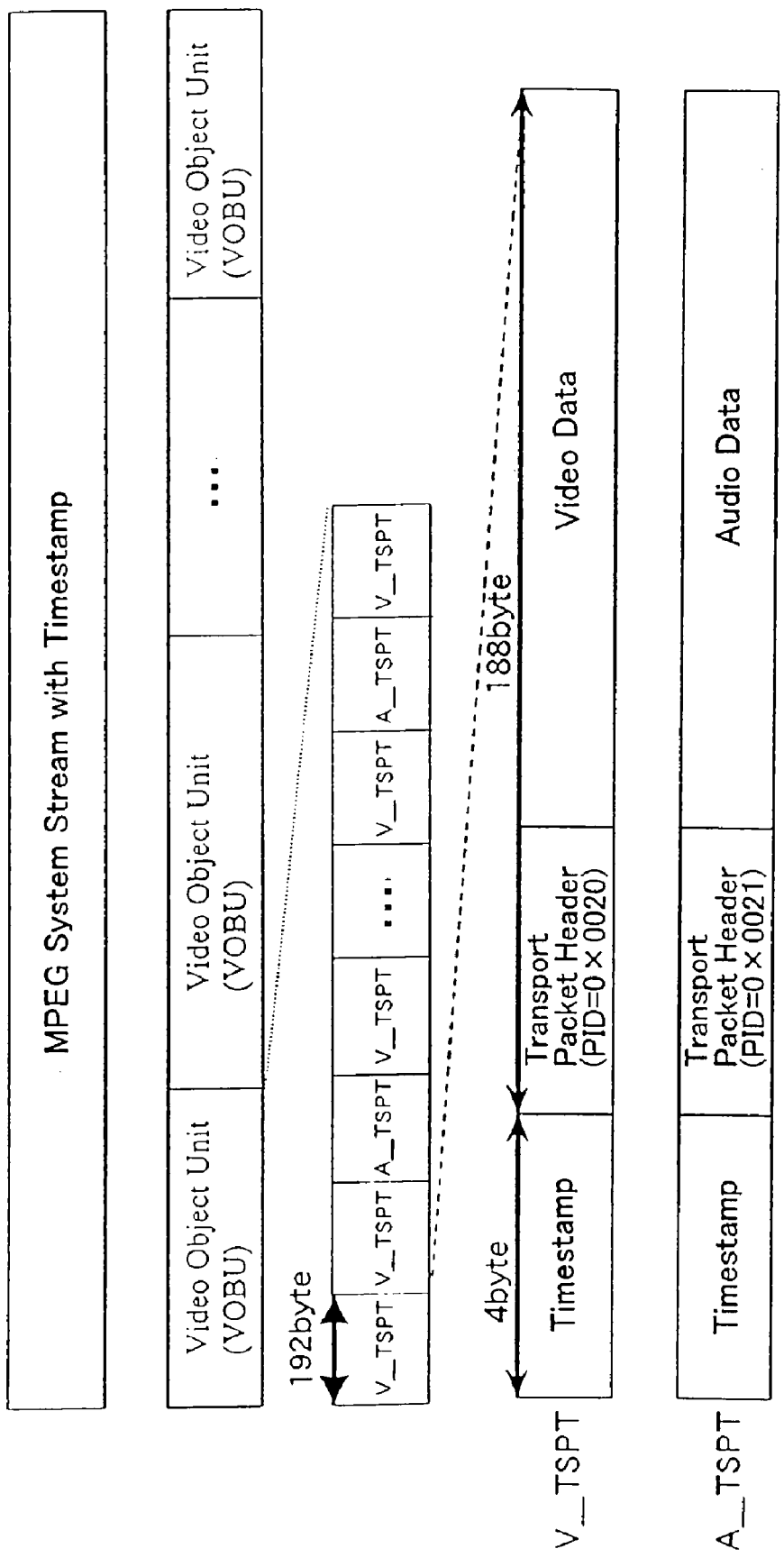
FIG. 37 is a diagram showing a recording form of an AV data recording apparatus in Embodiment 6 of the present invention.

FIG. 37 shows a record form in an AV data recording apparatus in Embodiment 6 of the present invention. FIG. 37 differs from FIG. 2 showing record form in an AV data recording apparatus in Embodiment 1, in that 4 byte timestamp is added before each transport packet. A VOBU is composed of sets of a timestamp and a video transport packet ("V_TSPT" in FIG. 37), and sets of a timestamp and an audio transport packet ("A_TSPT" in FIG. 37).

Since a timestamp is recorded with the above-mentioned structure, capacity of recording video data is decreased by about 2% when compared to Embodiment 1. Another demerit is that a file cannot be a pure data stream of a MPEG standard at the time of connecting to a PC. Nevertheless, this structure is advantageous when compared to Embodiment 1 in that the output timing adjustment section 14 can act as the output timing generating section 13.

In other words, 1394 output will be available only by simple timing adjustment using a timestamp value added at the time of recording without generating output timing for every transport packet based on the MPEG standard performed by the output timing generating section 13.

Similar to Embodiment 1, recording/reproduction of a video through a 1394 interface can be performed easily and continuous reproduction of a video is available. Also at the time of connecting to a PC, since this embodiment provides a data stream that is extremely similar to a transport stream excepting the timestamps that are inserted regularly, MPEG reproduction software can correspond as an application for this PC in a quite simple manner.

When a standard clock of the timestamp value is determined to be 27 MHz, a 27 MHz clock used for recording/reproducing a video, or a 27 MHz that is clock-reproduced when inputting a MPEG transport stream through 139 interface can be substituted.

When a standard clock of timestamp value is determined to be 24.576 MHz, which is equal to a standard clock of the 1394 interface section 9, this can be substituted. At the time of connecting to a PC, this can be accessed as a file of a transport stream with a 24.576 MHz timestamp. This 24.576 MHz is equal to a standard clock of a 1394 interface section at the PC side. Therefore, even when a recorded file is isochronously transferred from the PC to external equipment through a 1394 transmission channel, the output timing can be adjusted based on the 24.576 MHz that is used at the 1394 interface section within a PC.

In other words, it is advantageous in that an exclusive clock circuit within a PC can be omitted when compared to a case of a similar operation using 27 MHz. The 192 byte structure using 24.576 MHz is identical to that of a source packet header (defined by IEC61883-4) that requires an assembly when transferred inside the 1394 interface. Therefore, the file can be transferred advantageously by itself as a data structure inside a 1394 interface.

As mentioned above, Embodiment 6 can provide 1394 output only by a simple timing adjustment using a timestamp value added at the time of recording without newly generating any output timing.

The data length of the timestamp in Embodiment 6 is not limited specifically to 4 bytes as in Embodiment 6.

Though the standard clock of the timestamp value is 27 MHz or 24.576 MHz in Embodiment 6, a separate clock within the apparatus also can be used as a standard.

Though the storage medium in this embodiment is a phase-change optical disk, the embodiment is not specifically limited thereto, but can be any recording medium of a disk form such as optical disks including DVD-RAM, MO, DVD-R, DVD-RW, DVD+RW, CD-R, CD-RW, and a hard disk. A semiconductor memory is also available.

Similarly, a readout head in this embodiment is a pickup, while it will be a pickup and a magnetic head for a MO, and a magnetic head for a hard disk.

In this embodiment, a transport stream can be in a form corresponding to a digital broadcast standard using MPEG, such as a transport stream corresponding to the Japanese BS digital broadcast standard, a transport stream corresponding to the ATSC standard in the USA, and a transport stream corresponding to the European DVB standard. Accordingly, a set top box (STB) for digital broadcast will have improved convertibility.

Or the form can correspond to digital data broadcast using MPEG. Accordingly, functions of the STB, including a function for receiving data broadcasting, can be utilized.

In the embodiments of the present invention, a logical block and a sector are determined respectively to be 32 kbytes and 2 kbytes. A logical block can be, for example, 16 kbytes as long as the logical block has a size as an integral multiple of the sector size. Or both the logical block and the sector can be 2 kbytes.

INDUSTRIAL APPLICABILITY

As mentioned above, the present invention provides an AV data recording apparatus, a video recording/reproducing apparatus thereof is advantageous in transferring a video easily to a D-VHS or to a set top box (STB) via a digital interface of IEEE 1394, and in recording to allow continuous reproduction. At the same time, the AV data recording/reproducing apparatus can reduce waste of its memory, and a MPEG system stream recorded at a time of connecting to a PC can be observed easily as data based on the MPEG standard.

In the AV data recording apparatus, the amounts of calculation process for deletion operation can be decreased considerably when a VOBU in the way of a MPEG stream is deleted and then the following VOBUs are linked to provide a stream that can be managed within an AV data recording/reproducing apparatus.

In addition, it can decrease amounts of calculation process in post-recording of a MPEG system stream.

As mentioned above, the present invention can provide easily an AV data recording apparatus having various functions concerning recorded videos (e.g., continuous reproduction, digital broadcast, file operation, partial deletion and post-recording).

What is claimed is:

1. An AV data recording apparatus comprising:
   a recording section operable to record, in a plurality of logical blocks on a recording medium, a data stream comprising a plurality of packets of a fixed length, the size of which has a non-integral multiple relationship with that of the logical block, formed on the basis of at least one signal being selected from a group containing an audio signal and a video signal;
   a logical block managing section operable to manage whether a logical blocks on the recording medium are used or not; and
   a continuous data area detecting section operable to detect a continuous data area on the recording medium comprising a plurality of continuous and unused logical blocks on the basis of a status of use for each of the logical blocks managed by said logical block managing section;
   wherein the plurality of packets of a fixed length included in the data stream are recorded continuously by said recording section without providing any spacing, in the continuous data areas on the recording medium detected by the continuous data area detecting section.

2. The AV data recording apparatus according to claim 1, wherein the continuous data area comprises plural continuous logical blocks that enable recording at a maximum recording/reproducing rate during at least a period required for securing reproduction data for a maximum move time of a reading/writing head at the continuous data area detection section.

3. The AV data recording apparatus according to claim 1, wherein the packets of a fixed length are transport packets.

4. The AV data recording apparatus according to claim 1, wherein a recording of the data stream which finishes in a midst of one of the logical blocks, is followed immediately by a continuous recording of a subsequent data stream.

5. The AV data recording apparatus according to claim 1, further comprising a data stream assembling section operable to form a data stream comprising a plurality of packets of a fixed length on the basis of at least one signal selected from the group containing the audio signal and the video signal.

6. An AV data recording method comprising:
   recording, in a plurality of logical blocks on a recording medium, a data stream comprising a plurality of packets of a fixed length, the size of which has a non-integral multiple relationship with that of the logical block, formed on the basis of at least one signal being selected from a group containing an audio signal and a video signal;
   managing whether logical blocks on the recording medium are used or not; and
   detecting, via an AV data recording apparatus, a continuous data area on the recording medium comprising a plurality of continuous and unused logical blocks on the basis of a status of use for each of the logical blocks managed by said logical block managing section;
   wherein the plurality of packets of a fixed length included in the data stream are recorded continuously by said recording without providing any spacing, in the continuous data area on the recording medium.

7. The AV data recording method according to claim 6, wherein the continuous data area comprises plural continuous logical blocks that enable recording at a maximum recording/reproducing rate during at least a period required for securing reproduction data for a maximum move time of a reading/writing head at a detection of the continuous data area.

8. The AV data recording method according to claim 6, wherein the packets of a fixed length are transport packets.

9. The AV data recording method according to claim 6, wherein a recording of the data stream which finishes in a midst of one of the logical blocks, is followed immediately by a continuous recording of a subsequent data stream.

10. The AV data recording method according to claim 7, further comprising forming a data stream comprising a plurality of packets of a fixed length on the basis of at least one signal selected from the group containing the audio signal and the video signal.

* * * * *